United States Patent
Lev et al.

(10) Patent No.: US 9,621,428 B1
(45) Date of Patent: Apr. 11, 2017

(54) MULTI-TIERED CLOUD APPLICATION TOPOLOGY MODELING TOOL

(71) Applicant: CISCO TECHNOLOGY, INC., San Jose, CA (US)

(72) Inventors: Koren Lev, Tel Mond (IL); Mehernosh Naval Vadiwala, Fremont, CA (US); Catherine Ruth Gulsvig Wood, St. Paul, MN (US); Derek Evan, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 302 days.

(21) Appl. No.: 14/248,504

(22) Filed: Apr. 9, 2014

(51) Int. Cl.
*H04L 12/24* (2006.01)
(52) U.S. Cl.
CPC .................. *H04L 41/12* (2013.01)
(58) Field of Classification Search
USPC ........ 715/735, 853; 709/226, 223, 220, 222, 709/224; 718/1, 100; 345/418, 441
See application file for complete search history.

(56) References Cited

U.S. PATENT DOCUMENTS

| | | | |
|---|---|---|---|
| 5,768,552 A | 6/1998 | Jacoby | |
| 7,197,561 B1 * | 3/2007 | Lovy | H04L 41/0233 709/217 |
| 2009/0157371 A1 | 6/2009 | Conway | |
| 2011/0029882 A1 * | 2/2011 | Jaisinghani | H04L 41/12 715/736 |
| 2012/0102180 A1 * | 4/2012 | Jaisinghani | H04L 41/12 709/223 |
| 2012/0275311 A1 | 11/2012 | Ivershen et al. | |
| 2012/0284008 A1 | 11/2012 | Ennis | |
| 2013/0232480 A1 * | 9/2013 | Winterfeldt | G06F 8/60 717/177 |

(Continued)

FOREIGN PATENT DOCUMENTS

WO  2009/007754  1/2009

OTHER PUBLICATIONS

Oasis, "Topology and Orchestration Specification for Cloud Applications," Version 1.0, Committee Specification 01, Mar. 18, 2013, 144 pages; http://docs.oasis-open.org/tosca/TOSCA/v1.0/cs01/TOSCA-v1.0-cs01.html.

*Primary Examiner* — Linh K Pham
*Assistant Examiner* — Wendy Nicholas
(74) *Attorney, Agent, or Firm* — Patent Capital Group

(57) ABSTRACT

An example multi-tiered cloud application topology modeling tool is provided that facilitates receiving metadata associated with a widget, the widget being expressive of an interface representing a base class of a topology element in a cloud application topology, the topology element being classified in one of a plurality of tiers of cloud application topology, adding an instance of the widget to the cloud application topology, enforcing rules described by the metadata that specify behavioral constraints on the widget in a context of the cloud application topology across the plurality of tiers, and modifying the cloud application topology according to the rules without human intervention, the modified topology being rendered on a canvas of a user interface of the cloud application topology modeling tool. In specific embodiments, the cloud application topology on the canvas is converted to a stack blueprint that can be executed to instantiate the topology.

20 Claims, 19 Drawing Sheets

(56) References Cited

U.S. PATENT DOCUMENTS

| | | | | |
|---|---|---|---|---|
| 2013/0311631 A1* | 11/2013 | Koo | ............... | G06F 9/5072 709/223 |
| 2015/0280996 A1* | 10/2015 | Berube | ............... | H04L 41/0853 709/224 |
| 2015/0295781 A1* | 10/2015 | Maes | ............... | G06F 9/5072 715/735 |

* cited by examiner

```
{
    "toolPallete":{                                                94
        "targetType":"",                                           ∕
        "numberOfEntries":"",
        "categories":[
            {
                "caption":"Zones",
                "categoryIcon":"icon-Dashlet_max",
                "subCategories":[ ],
                "components":[
                    {
                        "Id":226,
                        "logicName":"SbHot_PublicZone",
                        "caption":"Public Zone",
                        "imageUrl":""
                    },
                    {
                        "Id":228,
                        "logicName":"SbHot_PrivateZone",
                        "caption":"Private Zone",
                        "imageUrl":""
                    }
                ]
            },
            {
                "caption":"Common",
                "categoryIcon":"icon-untitled-106",
                "subCategories":[ ],
                "components":[
                    {
                        "Id":210,
                        "logicName":"SbHot_WaitCondition",
                        "caption":"Wait Condition",
                        "imageUrl":"./img/stack-canvas/icon-wait-32.png"
                    }
                ]
            },
            {
                "caption":"Compute",
                "categoryIcon":"icon-untitled-166",
```

FIG. 7

MULTI-TIERED CLOUD APPLICATION TOPOLOGY MODELING TOOL

TECHNICAL FIELD

This disclosure relates in general to the field of communications and, more particularly, to a multi-tiered cloud application topology modeling tool.

BACKGROUND

Offering Infrastructure-as-a-Service (IaaS) and Platform-as-a-Service (PaaS) that deliver multi-tier application stacks (e.g., sets of applications typically required by an organization; a typical enterprise application stack can include basic office functions (e.g., word processing, spreadsheet, database, etc.), a web browser, e-mail, instant messaging programs) in the cloud (e.g., a collection of hardware and software forming a shared pool of configurable computing resources that can be suitably provisioned to provide on-demand self-service, network access, resource pooling, elasticity and measured service, among other features) is a complex undertaking. It can involve stitching together layers of physical and virtual infrastructure in topologies that span compute, storage, network, security, operating system, and fully functional software application components to satisfy business requirements. Planning blueprints for the application stack and delivering fully provisioned and configured instances of the application stack can entail extensive collaboration of Information Technology (IT) architects and developers and subject matter experts across multiple disciplines.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified block diagram illustrating yet other example details of an embodiment of the cloud application topology modeling tool;

DETAILED DESCRIPTION OF EXAMPLE EMBODIMENTS

Overview

An example multi-tiered cloud application topology modeling tool is provided that facilitates receiving metadata associated with a widget, the widget being expressive of an interface representing a base class of a topology element in a cloud application topology, the topology element being classified in one of a plurality of tiers of cloud application topology, adding an instance of the widget to the cloud application topology, enforcing rules described by the metadata that specify behavioral constraints on the widget in a context of the cloud application topology across the plurality of tiers, and modifying the cloud application topology according to the rules without human intervention, the modified topology being rendered on a canvas of a user interface of the cloud application topology modeling tool. In specific embodiments, the cloud application topology on the canvas is converted to a stack blueprint that can be executed to instantiate the cloud application topology.

As used herein, a "widget" can comprise a software construct expressive of an interface representing a base class (e.g., lowest common denominator that includes a largest possible population) of a topology element. The term "topology element" is meant to encompass applications, management scripts, security policies, rules, computers, network appliances, servers, routers, switches, gateways, bridges, load balancers, security zones, firewalls, processors, modules, or any other suitable physical or virtual device, component, container, element, process, or object operable to exchange information in a network environment. Moreover, the topology elements may include any suitable hardware, software, components, modules, interfaces, or objects that facilitate the operations thereof. This may be inclusive of appropriate algorithms and communication protocols that allow for the effective exchange of data or information. "Cloud application topology" can include any arrangement of various interconnected topology elements, and includes physical topology (e.g., placement of the various topology elements including device location, ports, etc.) and logical topology (e.g., data flows within the network regardless of its physical architecture).

Example Embodiments

Figure 1:
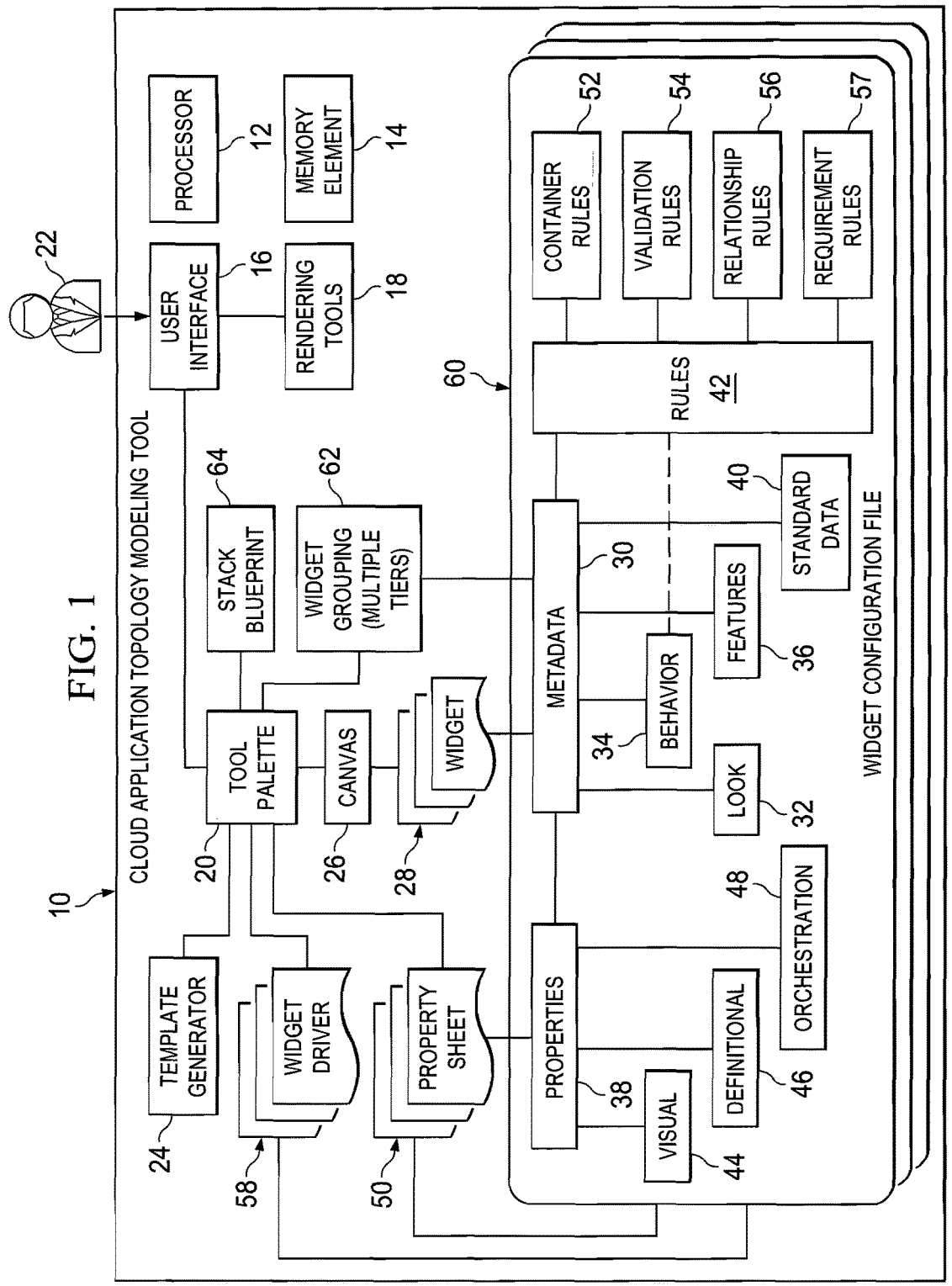
FIG. 1 is a simplified block diagram illustrating a multi-tiered cloud application topology modeling tool.

Turning to FIG. 1, FIG. 1 is a simplified block diagram illustrating a multi-tiered cloud application topology modeling tool 10 according to one example embodiment. Cloud application topology modeling tool 10 includes a processor 12 and a memory element 14 for performing various modeling operations as described herein. For example, cloud application topology modeling tool 10 may include instructions associated with data, wherein memory element 14 can store the instructions and the data, and processor 12 can execute the instructions to perform various operations. A user interface 16 may provide a set of rendering tools 18 and a tool palette 20 to a user 22 (e.g., a human). Rendering tools 18 may include drag and drop, select-by-click, highlight, draw-with-pointer, etc. Tool palette 20 may provide a template generator 24 that can generate cloud application topology templates.

Widget 28 can represent an emulation (e.g., duplicate, copy, etc.) of the topology element in the cloud application topology being modeled using cloud application topology modeling tool 10. For example, widget 28 can represent a switch at a network tier; another widget 28 can represent a server at a compute tier; yet another widget 28 can represent a firewall at a security tier, and so on. Each representation can involve various different behavior, features, properties, etc., according to the specific configuration and cloud application topology being modeled using cloud application topology modeling tool 10. Note that the cloud application topology can include network topology, application topology, security configurations, and other information associated with the topology elements represented by widgets 28.

Each widget 28 can include metadata 30 describing a look 32 (e.g., graphic representing widget, for example, circular disk represents router widget), a behavior 34 (e.g., actions that can be performed by widget, for example, server widget can only host applications and cannot route packets), features 36 (e.g., capabilities of widget, for example, server widget can host web files and email files, but cannot host databases), properties 38 (e.g., attributes constraining and defining the widget, for example, widget represents a Cisco 4500E access switch with corresponding name and specifications), standard data 40 (e.g., valid attribute values for properties) and rules 42. In some embodiments, look 32 may comprise a pre-defined graphic icon that is used to render widget 28 on canvas 26.

Widget 28 can have the following types of properties 38: visual [properties] 44, definitional [properties] 46, and orchestration [properties] 48. Properties 38 may be specified in respective property sheets 50, which may be rendered on user interface 16 through tool palette 20. Behavior 34 can be controlled by rules 42. At least three types of rules 42 can be applied to widget 28: container rules 52 (e.g., specifying parameters associated with containers representing one or more widgets, such as security zones), validation rules 54 (e.g., specifying validation of parameters associated with one or more widgets), relationship rules 56 (e.g., specifying relationships among widgets), and requirement rules 57 (e.g., specifying requirements for the widgets).

Custom widgets 28 can be added to tool palette 20 as needed (e.g., based upon particular configuration, network architecture, cloud application topology requirements, application needs, etc.) using one or more widget driver(s) 58. Metadata 30 for widget 28 may be specified appropriately in a corresponding widget configuration file 60. Cloud application topology modeling tool 10 may include rendering capability to render widget configuration file 60 appropriately on user interface 16. In many embodiments, widget configuration file 60 may comprise a JSON file format, which may be programmable and configurable by user 22. For example, user 22 may open widget configuration file 60 using an appropriate code editor (e.g., text editor) and change the content suitably.

In many embodiments, widget 28 may be selected from widget grouping 62 that includes multiple tiers of the cloud application topology. Tool palette 20 may provide canvas 26 and intelligent widget(s) 28, for example, to model business requirements through the different tiers of cloud application topology. As used herein, the "tiers of cloud application topology" refer to classifications of cloud application structure (e.g., architecture, arrangement, organization, construction, etc.) into approximately mutually exclusive domains (e.g., technology, areas, realms, provinces, fields) that involve distinct and disparate criteria (e.g., conditions, parameters, benchmarks, measures, etc.) for design (e.g., configuration, planning, arranging, etc.) and implementation (e.g., instantiation, execution).

In one example embodiment, the tiers of cloud application topology can include network (e.g., comprising basic network infrastructure including network zones, network interface cards (NICs), switches, routers, firewalls, etc.), storage (e.g., comprising devices and networks (storage area networks (SANs)) used exclusively for storing data), compute (e.g., comprising devices and networks (local area networks (LANs) used for computational functions), security (e.g., comprising edge and compute firewall rules, security rules, policies, access control lists, intrusion prevention, malware detection, etc.), software (e.g., comprising operating systems, software configurations, applications, etc.) and business (e.g., business purposes, recommended resource usage, target environment suitability, definitions of data files, attributes in business terms, business rules applicable to the attributes, data owners and stewards, user roles and permissions, data quality metrics, etc.).

In another example embodiment, the tiers of cloud application topology can include the layers of the Open System Interconnection (OSI) model of networks, such as Layer 2, Layer 3 . . . Layer 7. Virtually any classification can be used herein within the broad scope of the embodiments. Widgets 28 in each tier can have direct attachment points with widgets 28 in other tiers, making each tier understandable to the specific customer, and also understandable across different technologies for the solution architects.

Widget 28 from different tiers may be arranged on canvas 26 using multiple layers, if necessary, with dynamically created zones to represent areas of deployment in the cloud application topology (e.g., representing a visualized data center and network zones). In the visual rendering on user interface 16, widget grouping 62 and attachment points between different tiers in different layers can provide valuable insights to application developers, network administrators, device managers, and other users 22. An output of cloud application topology modeling tool 10 may comprise a stack blueprint 64. According to various embodiments, cloud application topology modeling tool 10 can provide a multi-layered visual method for modeling complex cloud application topologies that can be used to design, offer, and deliver IaaS and PaaS.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

An emerging challenge in a software development method that stresses communication, collaboration and integration between software developers and IT professionals) called DevOps includes capturing cloud application design elements and layers into a model that is easy to create, visualize, articulate, and fulfill and yet is also understood by the business customers who use the applications. Ideally, the model should be easy to assemble and document; it should support multiple contributors with various domains of expertise; and, it should be easy to modify and replicate, adapting to ongoing changes in requirements. It should also seem sensible to technical subject-matter experts and end-user consumers who are evaluating whether the application stack fits their business requirements. Ultimately, the visual rendering of the model should be technically complete, have business relevance, and translate seamlessly into a set of instructions that can be orchestrated to fulfill requests for instances of the application stack.

In a general sense, orchestration describes automated arrangement, coordination, and management of complex computer systems, middleware, and services. Orchestration as applied to cloud computing refers to aligning business requests with applications, data, and network infrastructure. Orchestration specifies policies and service levels through automated workflows, provisioning, and change management, creating an application-aligned network infrastructure that can be scaled up or down based on the needs of each application. Although orchestration is automated to a large extent, the automation remains specific to physical and virtual infrastructure implemented by respective particular cloud service providers. If services can be rendered interoperable and portable across alternative cloud implementation environments with at least semi-automatic creation and management of application layer services, cloud computing can become more valuable.

Various standardization efforts are ongoing to provide one or more languages and specifications to describe service components, services, and their relationships in a service topology to promote portability by normalizing descriptions of network topologies. For example, Topology and Orchestration Specification for Cloud Applications (TOSCA) is a proposed standard that seeks to promote such portability through a standardized topology template. The template uses an Extensible Markup Language (XML) document to describe the topology, but is not prescriptive regarding how the XML document is built. The TOSCA topology template consists of node templates (e.g., cloud platform elements such as compute nodes, network devices, storage, etc.) and relationship templates that together define the topology model of a service as a (not necessarily connected) directed graph.

The core TOSCA specification provides a language (e.g., XML) to describe service components and their relationships using a service topology, and it provides for describing the management procedures that create or modify services using orchestration processes. The combination of topology (e.g., structure) and orchestration (e.g., invocation of management behavior) of IT services in a Service Template document describes what is needed to be preserved across deployments in different environments to enable interoperable deployment of cloud services and their management throughout the complete lifecycle (e.g. scaling, patching, monitoring, etc.) when the applications are ported over alternative cloud environments.

Although the TOSCA specification describes an XML domain-specific language (DSL), other efforts such as Cloudify: Cosmo™ from Gigaspaces™ have resulted in TOSCA-inspired Yet Another Markup Language (YAML) specification that may be easier to read, but difficult to create and visualize. Vino for Tosca is another effort seeking to define a visual notation for TOSCA that builds on designs currently captured in a complex XML specification. While Vino for Tosca has identified that visualization is essential to effective consumption of the TOSCA approach, it is in its infancy and has to date only provided basic examples of how the different TOSCA design elements should be rendered visually. Vino for Tosca does not capture what it takes to visually render the model and what the visual pallet and behaviors are.

Cisco™ Virtualized Multiservice Data Center (VMDC) virtual services architecture (VSA) provides a reference architecture for the infrastructure supporting cloud applications; the visual model can be used to capture and implement the architecture through a cloud offering. The models are static and capture specific converged infrastructure topology. As with Cisco VSA, several other cloud platforms, including BMC™ CLM, Citrix™ CloudStack™, VMware™ vCloud Suite (to name a few), provide supported containers and/or virtual data centers for infrastructure to support IaaS and PaaS offerings. Although the visual representation makes it easy to order the secured network and compute containers that the application requires, the visual representations are fairly static blueprints and do not address the full stack from top to bottom (e.g., application layer 7 to transport layer 2 in the OSI network model), with all the details required to instantiate the complete application stack.

Cisco Intelligent Automation for Cloud (IAC 4.0) is a cloud management platform designed for enterprise and public sector IT organizations building private and hybrid clouds, and service providers deploying public or virtual private cloud services. IAC may support VMDC VSA virtual infrastructure architectures and potentially physical networking. For example, the Application Stack Accelerator in IAC 1.40 can deliver application blueprints that increase IT efficiency through standardized application deployment. With integration to Puppet™ and Chef™, Application Stack Accelerator facilitates complete application stack design (including operating system, middleware, database, etc.) that can be ordered through the IAC self-service portal. Although VSA architectures are supported, current implementations of IAC 4.0 may fall short in ease of designing and implementing the architectures so that they can be instantiated easily.

Anuta Networks™ provides a drag and drop canvas for network topology and provisioning with a network-centric approach that does not provide an easy understanding of how the networking solution maps to application requirements and the connection points between other required infrastructure components (e.g., storage, security, operating systems and application). While useful for managing network infrastructure, it does not address how that infrastructure provides instantiated requirements of a fully delivered cloud application.

Cisco's Curvature/Donabe project demonstrates a highly interactive, modern user interface in Curvature™ for ordering network-connected virtual machines (VMs) that could be instantiated at a push of a button directly against OpenStack™. Further, pre-defined containers can be defined as templates in Donabe™, added to a toolbox, and dragged onto the Curvature canvas with connections between them (and/or to the internet). Donabe containers can be nested providing multiple layers of networked-contained compute that can be used to build up more complex network topologies. As with Anuta Networks, the Curvature/Donable project is network-centric.

Visio™ is a visual rendering tool that can be used to model virtually any physical configuration, including network topologies. Metadata can be associated with objects in the Visio diagram. However, due in part to the wide applicability and generalization of Visio, producing multi-dimensional diagrams and overlays is tedious and the results, more often than not, can be unsatisfactory. Moreover, the network topology blueprint created using Visio cannot be used as input into an automated orchestration process.

Typically, the emphasis of such existing products is on instantiation of network and compute containers. However, some of the greatest challenges in cloud orchestration can arise from post-instantiation activities such as initial configuration and ongoing maintenance. In many scenarios, it can be the post-instantiation plans for the network, computer, and software components that transform them into objects that are meaningful and useful for end-users. Existing solutions either address only one aspect (e.g., network only; application only; etc.) of the cloud application topology or represent the complexities in formats that are difficult to create, visualize, and understand. There is no product in the cloud marketplace today that captures the entire PaaS stack of objects in a single, unified canvas and demonstrates in a clear and consumable way how those components interact with each other.

Cloud application topology modeling tool 10 is configured to address these issues (among others) to offer a system and method for modeling cloud application topologies across multiple tiers, including network, storage, compute, and application. According to various embodiments, user interface 16 may receive widget metadata 30, for example, according to a user 22's selection of a specific widget 28. Metadata 30 may be received when widget configuration file 58 corresponding to selected widget 28 is loaded (e.g., writing contents from one memory element (e.g., hard disk drive) into another memory element (e.g., processor cache) in preparation for execution) into memory element 14 and may be rendered on canvas 26 on user interface 16. User interface 16 may receive widget metadata 30 when widget configuration file 58 is loaded into memory element 14.

In some embodiments, user 22 may select specific widget 28 from a list of pre-defined available widgets in tool palette 20 with default metadata 30 corresponding thereto. Such widget(s) 28 may be implicit and automatically added based on other widgets and the cloud application topology/orchestration requirements (and other appropriate factors). In other embodiments, user 22 may select specific widget 28 from a list of pre-defined available widgets in tool palette 20 and modify widget metadata 30 using drill down property sheets 50 to modify property values. In yet other embodiments, user 22 may use widget driver 56 to generate specific widget 28 and load it on memory element 14. Widget driver 56 may be used to generate widget configuration file 58 corresponding to specific widget 28.

In a general sense, widget driver 56 may comprise pluggable implementations for each topology element type such as a specific switch, server, router, firewall, etc. or a compute configuration plan. Widget driver 56 can extend a base definition of the topology element type and provide topology element-specific details. The details can be inserted (e.g., accessed, derived, extracted, etc.) from an externally definable data source. For example, a compute node can allow selection of an OpenStack™ flavor (e.g., specification, property, etc.) in its properties, where the available flavors are defined in a specific OpenStack environment. In another example, the compute configuration plan may comprise a Chef™ cookbook (Chef is an automation platform that transforms infrastructure into code, wherein reusable definitions written in Ruby™ programming language are called cookbooks) or a Puppet™ module (a desired state of the compute infrastructure's configuration can be defined using Puppet Enterprise's declarative language into modules). Various other selection options may be included within the broad scope of the embodiments.

An instance (e.g., specific realization, occurrence, etc.) of selected widget 28 may be added to the cloud application topology. Selected widget 28 may enforce rules 42 to determine if the cloud application topology is to be modified in any manner. Rules 42 may specify behavioral constraints on widget 28 in a context of the cloud application topology across the plurality of tiers in widget grouping 62. For example, two 'server' widgets in one 'zone' widget may require a 'switch' widget to communicate with each other, and also across the 'zone' widget boundary with other widgets. Thus, rules 42 may require a constraint on 'server' widget specifying that communication between two 'server' widgets in the cloud application topology at the compute tier require a 'switch' widget in the network tier. The device manager user 22 adding the 'server' widgets may be unaware of the rule; however, cloud application topology modeling tool 10 can apply the rule automatically and modify the cloud application topology as needed without prompting, instructions, or any other human intervention from user 22.

In various embodiments, widget 28 can infer cloud application topology design elements based on choices user 22 makes. For example, when user 22 drags a 'network' widget into a 'zone' widget, the 'zone' widget can automatically trigger adding a 'router' widget to canvas 26. In another example, creating a load-balanced pool of 'compute' widget(s) can automatically trigger adding a 'load balancer' widget. In yet another example, adding a protected 'zone' widget can automatically add an 'edge firewall' widget. In yet another example, adding a 'web server' widget can trigger display of property sheets 50 for specific firewall rules (e.g., compute or edge) to modify corresponding properties 38.

If the cloud application topology is to be modified, widget 28 can add relationship rules 56 among widgets on canvas 26. For example, a 'subnet' widget in a specific layer and another 'subnet' widget with the same metadata in another layer can cause a relationship rule to apply, connecting the two layers together at the 'subnet' widget. Widget 28 can also add another widget on to canvas 26. For example, when user 22 drags a 'network' widget into a 'zone' widget, the 'zone' widget can automatically add a 'router' widget to canvas 26.

In some embodiments, the additional widget may be automatically selected from a different tier of widget grouping 62, and a corresponding attachment point may be automatically added. For example, adding a second 'server' widget from a compute tier can trigger automatically adding a 'switch' widget from the network tier, with an attachment point (e.g., port) being automatically inserted to connect the 'server' widget and the 'switch' widget. The nature of the attachment point may depend on the tiers and the topology elements being connected. For example, a port attachment point may be applicable to connections between the compute tier and the network tier; a security profile attachment point may connect a security tier and a network tier; a virtual machine attachment point may connect an application tier and a compute tier; and so on. Further, widget 28 can also suggest modifying widget properties. For example, adding a 'web server' widget can trigger suggestion for specific firewall rules.

User interface 16 may check user view permissions of user 22 (e.g., based on user roles such as application developer, stack administrator, device manager, etc.), and render the cloud application topology on canvas 26 according to the view permissions. In some embodiments, the cloud application topology may be rendered on user interface 16 in layers. The layers may be created, modified, and viewed on canvas 26 into which widgets 28 can be dragged and dropped or otherwise created using rendering tools 18. The layers can be saved as templates by template generator 24 for re-use by other blueprints. For example, VSA reference architectures can be specified to provide a starting point for building on other layers of a cloud application stack. In another example, a basic 3-tier web, application, and database topology can be defined, saved, and re-used in different blueprints supporting different application configurations.

In some embodiments, the layers may be based on tiers of widget grouping 62. In one example embodiment, one layer may display substantially all compute tier widgets in the cloud application topology; another layer may display substantially all network tier widgets in the network; and so on. In some embodiments, the layers may be based on zones, which themselves are widgets. For example, one layer may display substantially all widgets in a public network zone; another layer may display substantially all widgets in a private network zone; and so on. In yet other embodiments, each layer may display a custom view of a portion of the cloud application topology, for example, based on user preferences or instructions.

According to various embodiments, the layers may be modified and viewed in isolation or in combination. A full multi-layered view can include substantially all layers for a complete picture of the application topology. Canvas 26 can also render multi-layered views in different ways showing different perspectives on the cloud application topology. For example, one perspective may be relevant to the network engineer and another perspective may be relevant to the application designer.

In various embodiments, intelligent widget(s) 28 can encapsulate visualization properties and behaviors. Canvas 26 can capture the cloud application topology in a single 'pane of glass' (e.g., display), rather than in traditional forms-based (e.g., Amazon Web Services), or script-based (e.g., XML/JSON/YAML). Embodiments of cloud application topology modeling tool 10 can capture requirements and capabilities of topology elements and relationships among them (e.g., as described by TOSCA) through easy-to-use user interface 16. The process of designing visually can be self-documenting, where the model is the visually rendered design, which can be used to generate instructions for automated orchestration. Thus, virtual data centers that specifically meet the requirements of the design can be dynamically created and provisioned.

In various embodiments, tool palette 20 may be saved in JSON file format, and user 22 may edit the file suitably to apply display restrictions based on business requirements. For example, tool palette 20 may be modified to gray out and render unavailable network tier widgets to an application developer; likewise, tool palette 20 may be modified to gray out and render unavailable application tier widgets to a network designer, and so on. Virtually all aspects of cloud application topology modeling tool 10 may be configurable and portable across multiple cloud environments for various disparate end user requirements.

In various embodiments, the cloud application topology created using cloud application topology modeling tool 10 may comprise stack blueprint 64. Stack blueprint 64 may comprise substantially all widgets 28, including associated metadata 30 that specifies attribute values, relationships, etc., across multiple tiers of cloud application topology. Stack blueprint 64 can be executed to instantiate (e.g., create an instance by, for example, locating widgets 28 in some physical place) the cloud application topology in a cloud (or other network). For example, in some embodiments, stack blueprint 64 can be converted to an XML, JSON or YAML document at any time. In some other embodiments, stack blueprint 64 can be orchestrated, for example, at a push of a button by passing the document representing stack blueprint 64 to an orchestrator. Stack blueprint 64 can be easily transported to another visual design environment, lending itself well to joint development and code sharing. In some embodiments, stack blueprint 64 can be brought under version control. Stack blueprint 64 can be copied, edited or targeted to specific cloud management platforms based on user requirements or other needs as appropriate.

According to various embodiments, cloud application topology modeling tool 10 may be metadata-driven and platform-agnostic; objects may be defined via plug-in widget driver(s) 58 that specify visualization properties, behaviors, rules, requirements, capabilities, methods, orchestration details. In some embodiments, cloud application topology modeling tool 10 can provide multi-view intelligence, where the view and/or attributes of a specific topology element (e.g., router) shown (e.g., used, rendered, etc.) in a particular target system (e.g., data center network) may be different when shown in another target system (e.g., campus network).

Embodiments of cloud application topology modeling tool 10 can represent an application stack substantially completely, for example, in terms of the level of technical detail required to create the stack and in terms of the business purpose and relevance of each component (e.g., topology element) in the stack. Therefore, with embodiments of cloud application topology modeling tool 10, translating a business view of an application into a technical architecture may not be required; the visual model can include both the business metadata and the technical fulfillment requirements.

Embodiments of cloud application topology modeling tool 10 provide visual modeling canvas 26 as a foundation for an entire life-cycle (e.g., publish, revise, version control, offer, order and orchestrate) of a cloud application, from design through deployment and maintenance lifecycle. Embodiments of cloud application topology modeling tool 10 can provide a visual rendering of the cloud application topology model with the cloud application that facilitates an effective method for building the cloud application topology. Layered visualization can make it easier to understand and consume the cloud application topology architecture than traditional form, script and document-based methods. Embodiments of cloud application topology modeling tool 10 can facilitate creating a stack manifest (e.g., a list of substantially all the pieces of the application stack) that a user can receive when requesting an instance of the application stack. The stack manifest and other features in embodiments of cloud application topology modeling tool 10 may provide configuration of individual topology elements and specific challenges (e.g., boot sequence) of context within the application stack during the application stack's life-cycle.

Embodiments of cloud application topology modeling tool 10 can successfully capture various diverse cloud architectures on user interface 16, providing an end-to-end platform for design, ordering, provisioning, assurance, fulfillment monitoring and version control. A layered approach is facilitated where each component from specific technology has direct relationship to other technologies presented in other layers on the same unified canvas 23. In some embodiments, layers per technology (e.g., network, compute, security, compute, storage, application) may be visually rendered with different views for each subject matter expert, while maintaining underlying relationships within and between technologies. Data model/policy driven intelligent pluggable widget(s) 28 can be built (e.g., configured, generated, created, etc.) to actual customer specifications and use cases across varying virtual and physical equipment and software to satisfy business requirements. Embodiments of cloud application topology modeling tool 10 can provide life-cycle management for the entire application stack. Embodiments of cloud application topology modeling tool 10 may be useful and practical for diverse orchestrator types (e.g., due to alignment to TOSCA principles). Intelligence (e.g., analytic and logical capabilities, understanding, planning, etc.) can be provided in the visual tool that spans multiple specific domains of interest to a cloud service provider.

Embodiments of cloud application topology modeling tool 10 can have broad applicability to enterprise and service provider IT architects, their vendors, customers, and professional services and various engineers of all disciplines working in DevOps. According to various embodiments of cloud application topology modeling tool 10, a finalized infrastructure and application design can be captured as unified visual blueprints with the underlying objects and their relationships described in a pre-defined data model (e.g., similar to TOSCA) that can be presented in different formats and fully orchestrated from end-to-end incorporating any number of domain element managers. Any suitable cloud application topology (including network topology, applications, etc.) can be modeled and designed using cloud application topology modeling tool 10 to include any number of servers, hardware accelerators, virtual machines, switches (including distributed virtual switches), routers, and other topology elements inter-connected to form a large and complex network.

Turning to the infrastructure of cloud application topology modeling tool 10, cloud application topology modeling tool 10 may be implemented on any suitable computing device (e.g., server, desktop computer, laptop computer, smart phone, etc.) equipped with appropriate hardware (e.g., display screen, monitor, processor, memory element, etc.) to facilitate the operations thereof. In some embodiments, cloud application topology modeling tool 10 may interface with the hardware (e.g., display monitors) to perform the operations described herein. For example, user interface 16 may be rendered on a display screen visible to user 22, and may be associated with other hardware (e.g., mouse, joystick, touchscreen, and keyboard) through which user 22 can manipulate widgets 28 in user interface 16.

In various embodiments, cloud application topology modeling tool 10 may be located on a single computing device. In other embodiments, cloud application topology modeling tool 10 may be distributed across multiple devices on a network, which can include any number of interconnected servers, virtual machines, switches, routers, and other nodes. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

In some embodiments, cloud application topology modeling tool 10 may include applications and hardware that operate together to perform the operations described herein. For example, a portion of cloud application topology modeling tool 10 may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of filter design tool 10. It should be understood that the architecture shown in FIG. 1 is simplified for ease of illustration.

Figure 2:
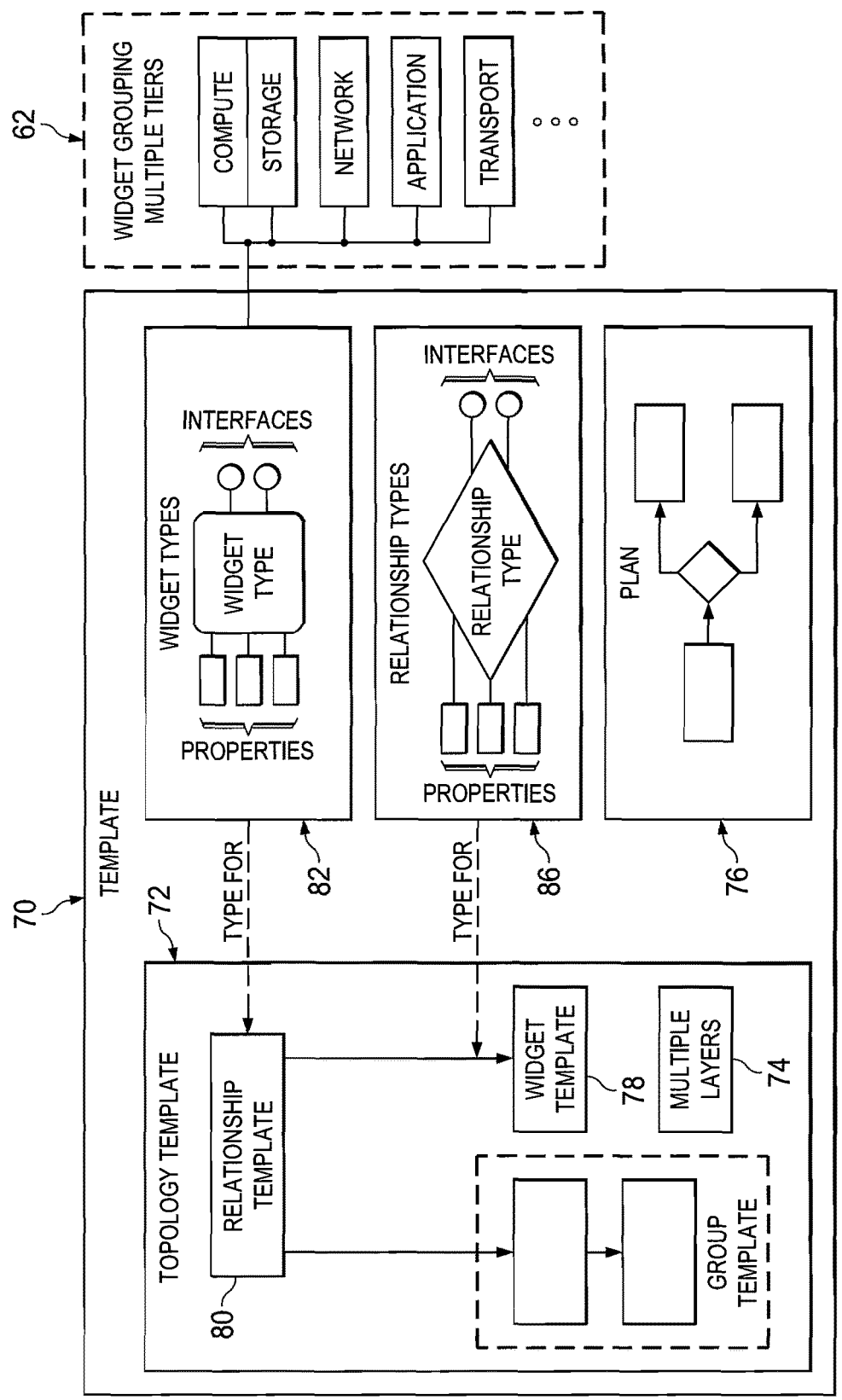
FIG. 2 is a simplified block diagram illustrating example details of an embodiment of the cloud application topology modeling tool.

Turning to FIG. 2, FIG. 2 is a simplified block diagram illustrating example details of an embodiment of cloud application topology modeling tool 10. Template generator 24 of cloud application topology modeling tool 10 can be used to generate a template 70. Template 70 may include a topology template 72, defining a structure of the network, which may be rendered in multiple layers 74. Plan 76 may define a process model that can be used to create, manage, and terminate the entire application stack during its whole life-cycle. Topology template 72 may include a set of widget templates 78 and relationship templates 80 that together define the cloud application topology model of the cloud applications (including network, security, applications, etc.) as a (not necessarily connected) directed graph (a node in the graph may be represented by widget template 78).

Widget template 78 may specify occurrence of a widget type 82 as a component of the cloud application topology. Widget type 82 may specify properties of a topology element (e.g., via widget type properties) and operations (e.g., via interfaces) available to manipulate the component. Widget types 82 may be defined separately (e.g., in separate files) for reuse purposes and widget template 78 may references widget types 82 and add suitable usage constraints. Widget types 82 may conform to widget grouping 62 with multiple tiers. In the example illustrated in the figure, widget grouping 62 can include compute, storage, network, application, transport, etc. In some other embodiments, widget grouping 62 may follow OSI network layers (e.g., layer 2, layer 3 . . . layer 7). In yet other embodiments, widget grouping 62 may follow any appropriate user requirements. Virtually any suitable mutually exclusive technology domains may be specified as widget grouping 62.

For example, consider a network consisting of an application server, a subnet, and a storage device. Topology template 72 defining the network would include one widget template 78 of widget type "application server" in a compute tier, another widget template 78 of widget type "subnet" in a network tier, and a third widget template 78 of widget type "storage device" in a storage tier. The application server widget type 82 can specify properties such as the IP address of an instance of this type, an operation for installing the application server with the corresponding IP address, and an operation for shutting down an instance of the application server. A constraint in corresponding widget template 78 can specify a range of IP addresses available when making a concrete application server available in the network.

Relationship template 80 may specify occurrence of a relationship between widgets in topology template 72. Each relationship template 80 may refer to a relationship type 86 that defines semantics and any properties of the relationship. Relationship types 86 may be defined separately for reuse purposes. Relationship template 80 may indicate the widgets it connects and the direction of the relationship by defining one source and one target element. For example, a relationship can be established between the subnet widget template in the previous example and application server widget template with the meaning "deployed in", and between the application server widget template and storage device widget template with meaning "connected to."

A deployed cloud application topology may comprise an instance of a specific template 70, derived by instantiating topology template 72, for example, by executing a build plan associated with template 70. The build plan can provide actual values for various properties of the various widget templates 78 and relationship templates 80 of topology template 72. The values may be input by user 22 (e.g., by human interactions specified within the build plan), or by automated operations (e.g., a directory lookup) specified within the build plan; the values may also be pre-configured in template 70.

The build plan may typically make use of operations of widget type 82. For example, the application server widget template of the previous example may be instantiated by installing an actual application server at a concrete IP address considering the specified range of IP addresses of widget template 78. The subnet widget template may be instantiated by dividing the network into at least one subnet including the application server (as indicated by the "deployed in" relationship template). The storage device widget template may be instantiated by connecting the application server and the storage device (as indicated by the "connected to" relationship template).

Plan 76 may describe management aspects of the topology element instances, especially their creation and termination. Plan 76 can be specified as process models (e.g., a workflow of one or more steps). Any suitable language for defining process models can be used within the broad scope of the embodiments. The process model can contain tasks that refer to operations of interface of widget templates or any other interface (e.g. invocation of an external service for licensing); thus, plan 76 can directly manipulate nodes of the cloud application topology.

Figure 3:
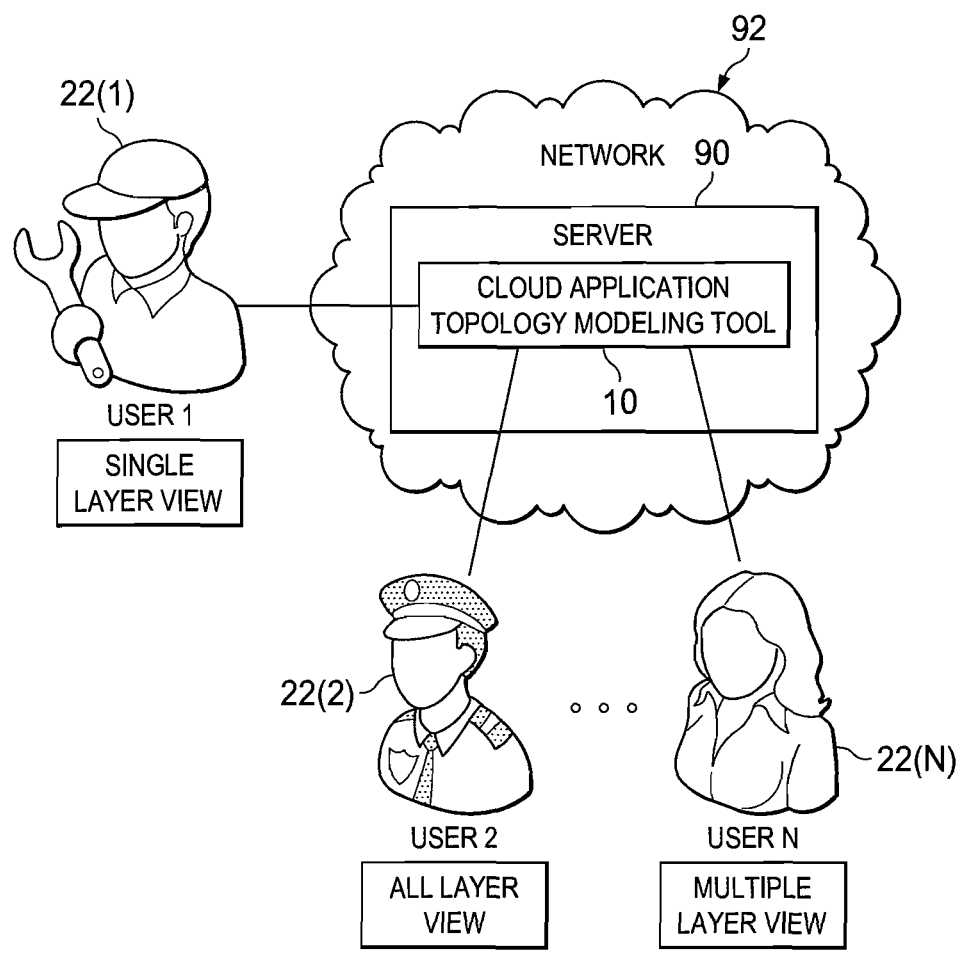
FIG. 3 is a simplified block diagram illustrating other example details of an embodiment of the cloud application topology modeling tool.

Turning to FIG. 3, FIG. 3 is a simplified block diagram illustrating example details of an embodiment of cloud application topology modeling tool 10. A plurality of users 22(1)-22(N) may access (e.g., synchronously, asynchronously, etc.) cloud application topology modeling tool 10 executing on a server 90 in a network 92. User 22(1) may represent an application developer; user 22(2) may represent a network administrator; user 22(N) may represent a device manager; and so on. Each user 22(1)-22(N) may be able to view different perspectives of the same cloud application topology in cloud application topology modeling tool 10. For example, the role of user 22(1), as application developer may correspond to a single layer view wherein only application tier widgets are displayed and configurable. User 22(1) may manipulate the cloud application topology to the extent of the visible widgets available according to the user's role. Changes to the cloud application topology by user 22(1) may translate automatically to changes in other tiers (e.g., network, storage, etc.) without any such indication to user 22(1).

In another example, the role of user 22(2), as blueprint administrator may correspond to a substantially all layer view wherein substantially all layers are displayed and configurable. User 22(2) may manipulate the cloud application topology extensively according to the user's role. In yet another example, the role of user 22(N), as device manager may correspond to a multiple layer view wherein some (e.g., compute, storage), but not all, layers are displayed and configurable. User 22(N) may manipulate the cloud application topology to the extent of the visible widgets available according to the user's role. Changes to the cloud application topology by user 22(N) may translate automatically to changes in other tiers (e.g., network, security, etc.) without any such indication to user 22(N).

Figure 4:
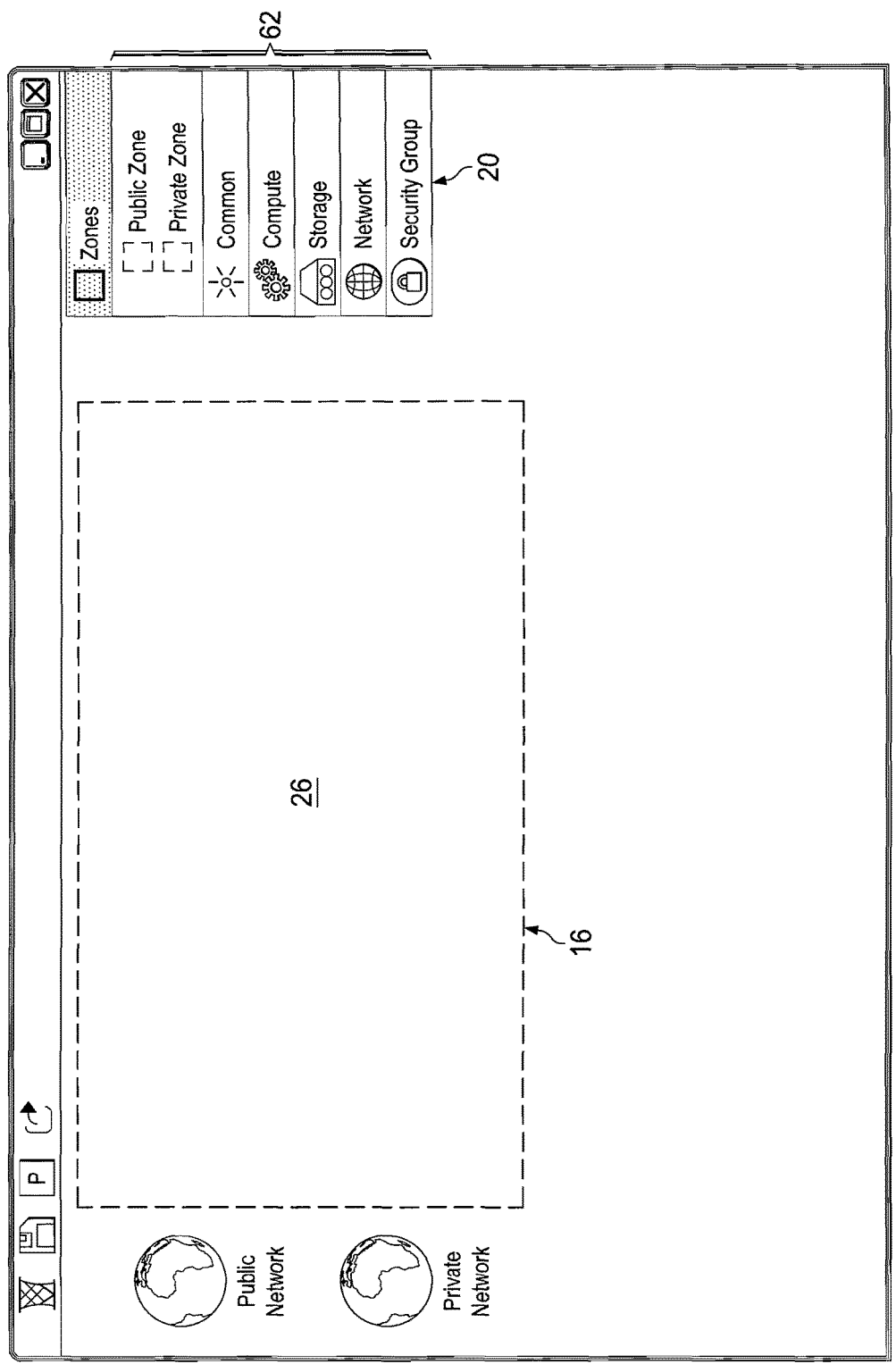
FIG. 4 is a simplified block diagram illustrating yet other example details of an embodiment of the cloud application topology modeling tool.

Turning to FIG. 4, FIG. 4 is a simplified block diagram illustrating example details of an embodiment of cloud application topology modeling tool 10. An example user interface 16 is illustrated, simplified for ease of illustration. Tool palette 20 may be provided, for example, as a menu, with multiple boxes specifying widget grouping 62 with multiple tiers. Widget grouping 62 shown as an example and not as a limitation, includes zones (e.g., public zone, such as the Internet, and private zones, such as an enterprise network), compute, storage, network, security group, etc. Any suitable set of approximately mutually exclusive tiers may be specified in widget grouping 62 within the broad scope of the embodiments.

Canvas 26 may be presented as an interactive rectangular window with visible borders. Canvas 26 may represent an "active" area of user interface 16 wherein certain rendering tools 18 (e.g., drag and drop, etc.) may be used; areas outside canvas 26 may be "passive" wherein the rendering tools 18 may be inactive. In addition, widgets within canvas 26 may be included within the cloud application topology suitably, whereas any widgets outside canvas 26 may be ignored. Various other menu options, such as layer displays, rendering tools, markers, text boxes, etc., may be available in user interface 16 within the broad scope of the embodiments. Note that the example format shown in the figure is merely for ease of illustration, and is not a limitation of embodiments of cloud application topology modeling tool 10. Virtually any suitable user interface 16 having the graphical components to achieve the functionalities described herein may be used within the broad scope of the embodiments.

Figure 5:
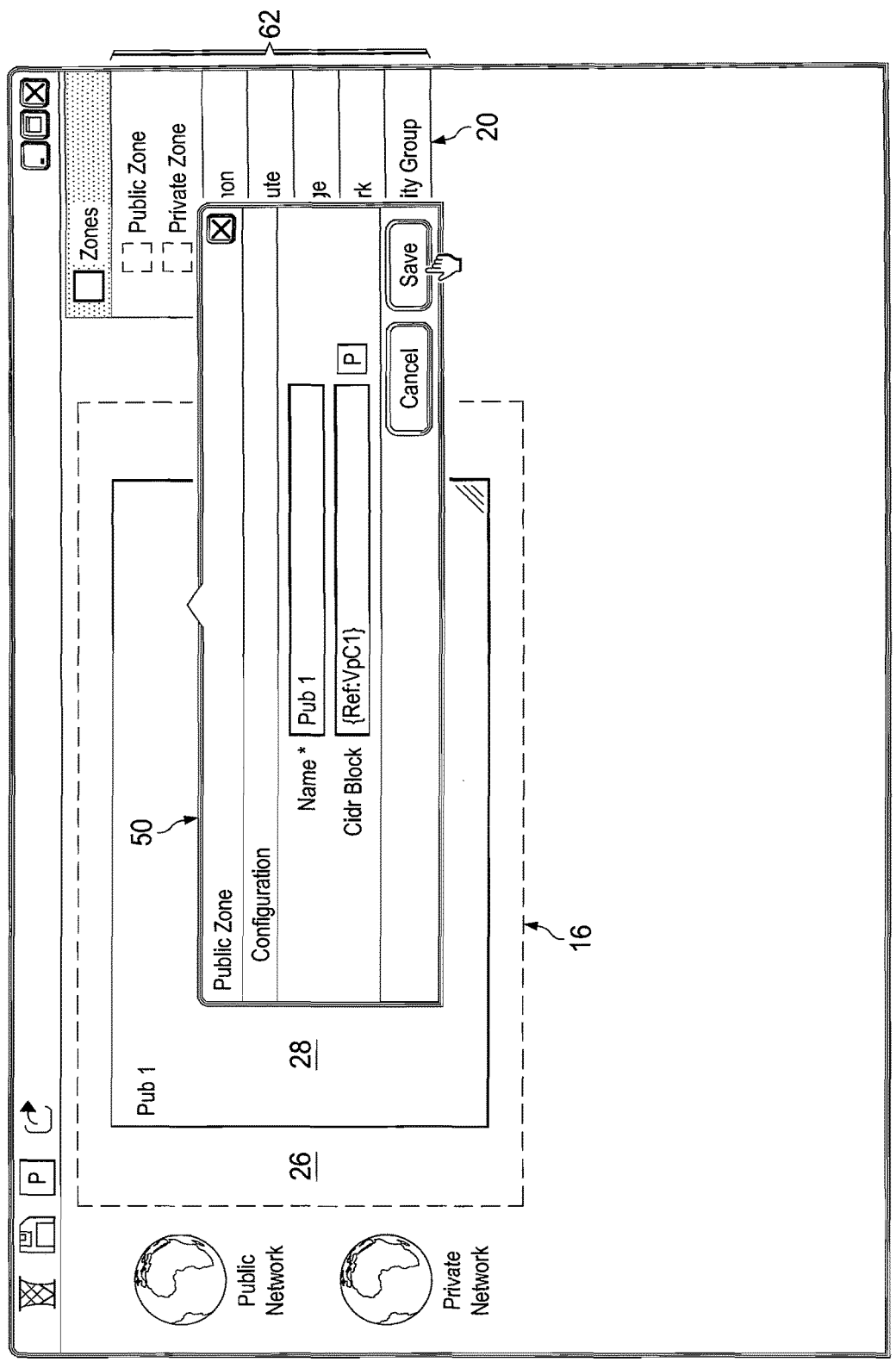
FIG. 5 is a simplified block diagram illustrating yet other example details of an embodiment of the cloud application topology modeling tool.

Turning to FIG. 5, FIG. 5 is a simplified block diagram illustrating example details of an embodiment of cloud application topology modeling tool 10. An example user interface 16 is illustrated, simplified for ease of illustration. Tool palette 20 may be provided, for example, as a menu, with multiple boxes specifying widget grouping 62. A 'zone' widget 28 for a public network may be inserted into canvas 26. Property sheet 50 may be displayed as a pop-up window to allow user 22 to insert applicable parameters. When user 22 'saves' the entered property values, corresponding widget configuration file 60 may be suitably modified with the entered values.

Figure 6:
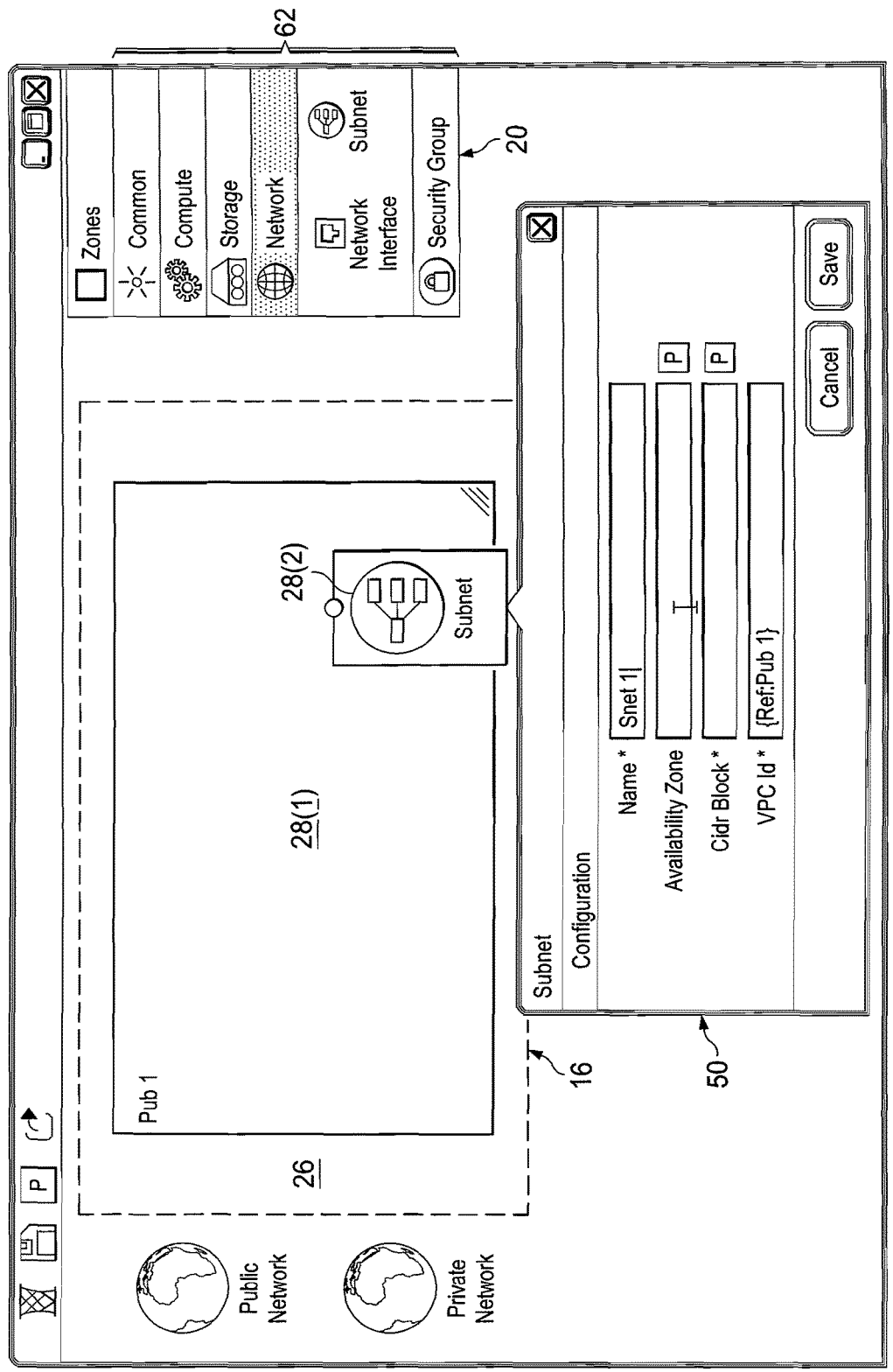
FIG. 6 is a simplified block diagram illustrating yet other example details of an embodiment of the cloud application topology modeling tool.

Turning to FIG. 6, FIG. 6 is a simplified block diagram illustrating example details of an embodiment of cloud application topology modeling tool 10. An example user interface 16 is illustrated, simplified for ease of illustration. Tool palette 20 may be provided, for example, as a menu, with multiple boxes specifying widget grouping 62. A 'zone' widget 28(1) may be inserted into canvas 26. A 'subnet' widget 28(2) may be deployed within 'zone' widget 28(1). A relationship may be established automatically between widgets 28(1) and 28(2), with 'subnet' widget 28(1) taking on a "deployed in" relationship with respect to 'zone' widget 28(1) based on the placement of 'subnet' widget 28(2) on canvas 26. Property sheet 50 may be displayed as a pop-up window to allow user 22 to insert applicable parameters for 'subnet' widget 28(2). When user 22 'saves' the entered property values, widget configuration file 60 corresponding to 'subnet' widget 28(2) may be suitably modified with the entered values.

Turning to FIG. 7, FIG. 7 is a simplified block diagram illustrating example details of an embodiment of cloud application topology modeling tool 10. Example code 94 represents a JSON file of tool palette 20 displayed on user interface 16. User 22 can modify JSON file 94 and thereby change tiers of widget grouping 62 displayed in tool palette 20. Note that any suitable file format may be used for rendering user interface 16 and its various components within the broad scope of the embodiments.

Figure 8:
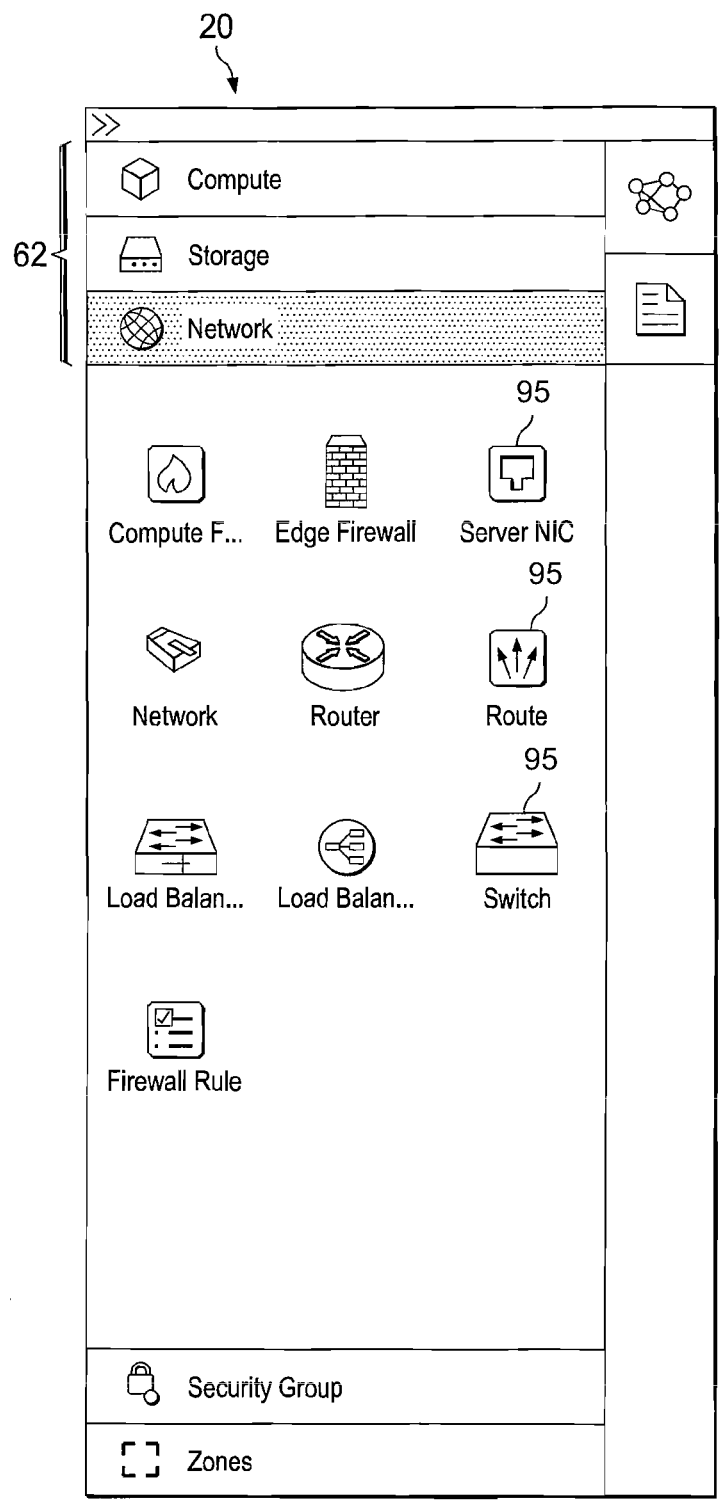
FIG. 8 is a simplified block diagram illustrating yet other example details of an embodiment of the cloud application topology modeling tool.

Turning to FIG. 8, FIG. 8 is a simplified block diagram illustrating example details of an embodiment of cloud application topology modeling tool 10. Example tool palette 20 may include a pre-defined set of widgets 28, represented using graphic icons 95. Each graphic icon 95 may represent a specific widget type 82 corresponding to a particular widget grouping 62. Note that virtually any suitable icon may be used in tool palette 20 within the broad scope of the embodiments. Further, not all of the widgets available in tool palette 20 has to be included in canvas 26 explicitly. In various embodiments, a need for lower-level widgets such as routers, switches, and load-balancers may be inferred based upon placement of higher-level widgets with which a stack designer is more likely to be concerned.

Figure 9:
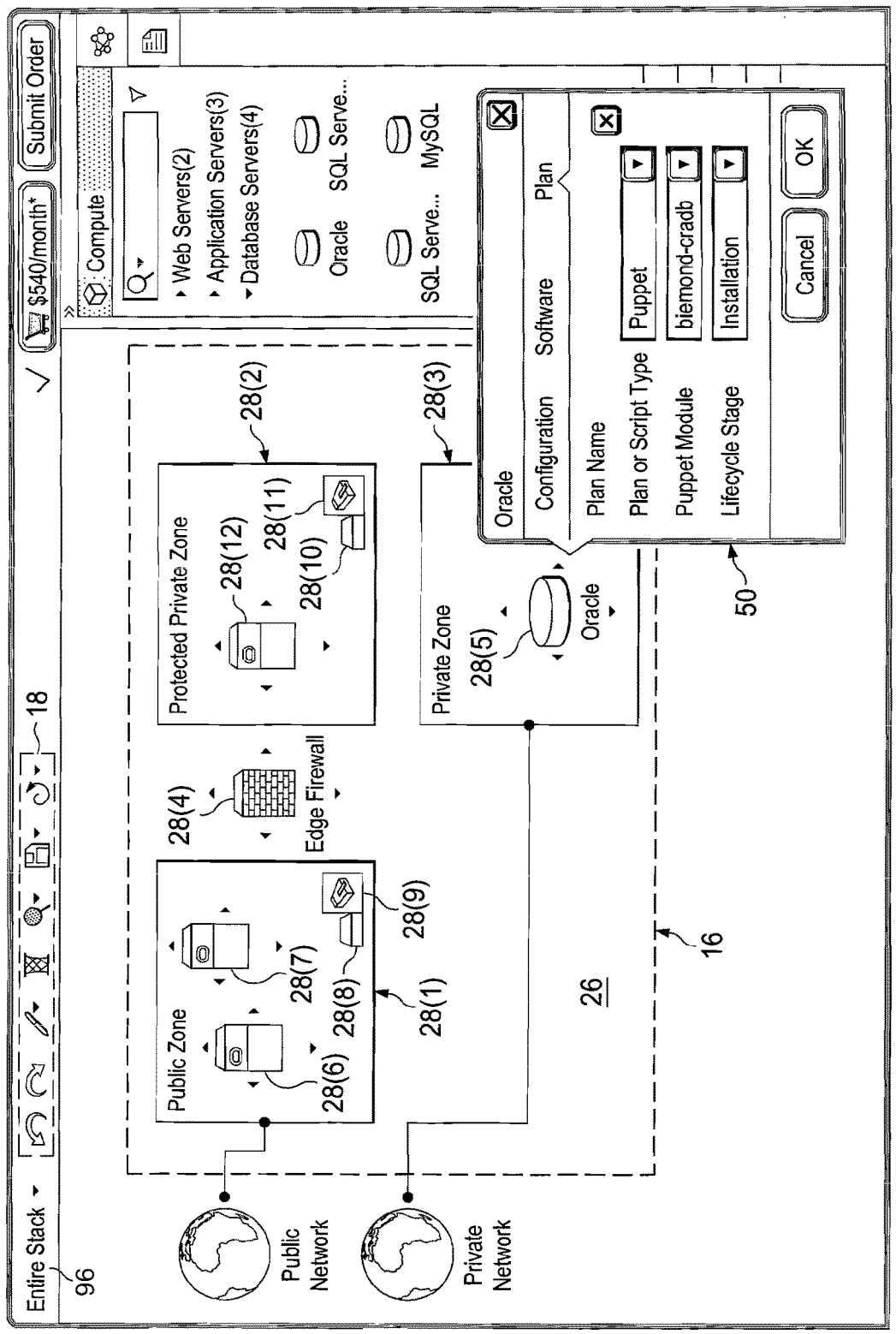
FIG. 9 is a simplified block diagram illustrating yet other example details of an embodiment of the cloud application topology modeling tool.

Turning to FIG. 9, FIG. 9 is a simplified block diagram illustrating example details of an embodiment of cloud application topology modeling tool 10. Example user interface 16 may include canvas 26, on which are placed a plurality of widgets 28(1)-28(12). Rendering tools 18 may be provided on user interface 16 for ease of rendering various widgets and relationships. A drop down menu 96 may be provided for displaying various tiers of the application stack rendered on user interface 16.

In the example illustrated, widget 28(1) represents a 'zone' widget with public zone characteristics; widget 28(2) represents another 'zone' widget with protected private zone characteristics; widget 28(3) represents yet another 'zone' widget with private zone characteristics; widget 28(4) represents a firewall; widget 28(5) represents a database server, whose properties may be inserted using property sheet 50; widgets 26(6) and 26(7) represent web servers deployed in widget 28(1) public zone; widget 28(8) represents a switch deployed in widget 28(1) public zone; widget 28(9) represents a subnet in widget 28(1) public zone; widget 28(10) represents another switch in widget 28(2) protected private zone; widget 28(11) represents another subnet in widget 28(2) protected private zone; and widget 28(12) represents an application server deployed in widget 28(2) protected private zone. In various embodiments, adding a second server widget to a specific zone widget may trigger automatically deploying a switch widget in the zone. Various widgets 28(4)-28(12) representing compute nodes in a compute tier of widget grouping 62 may be added to widgets 28(1)-28(3) representing network zones in a zone tier of widget grouping 62.

Figure 10:
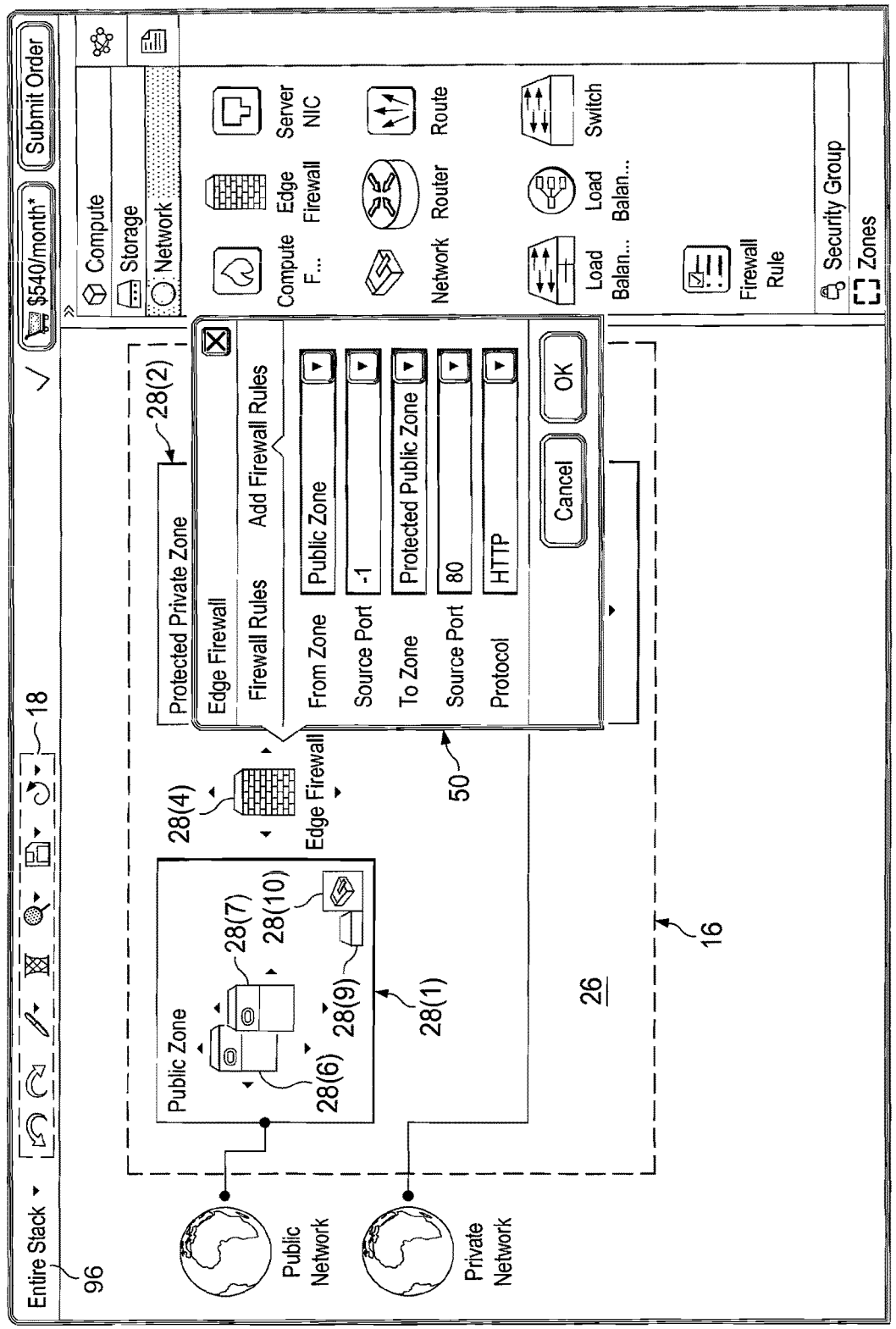
FIG. 10 is a simplified block diagram illustrating yet other example details of an embodiment of the cloud application topology modeling tool.

Turning to FIG. 10, FIG. 10 is a simplified block diagram illustrating example details of an embodiment of cloud application topology modeling tool 10. Example user interface 16 may include canvas 26, on which are placed a plurality of widgets 28(1)-28(10). Rendering tools 18 may be provided on user interface 16 for ease of rendering various widgets and relationships. Drop down menu 96 may be provided for displaying various tiers of the application stack rendered on user interface 16. Property sheet 50 corresponding to firewall widget 28(4) may be displayed to facilitate user entry of firewall rules applicable to firewall widget 28(4). In some embodiments, the format of property sheets 50 may be pre-determined and immutable. In other embodiments, the format of property sheets 50 may be changed by a super-user, such as a network administrator, for example, to customize cloud application topology modeling tool 10 for the specific business use.

Figure 11A:
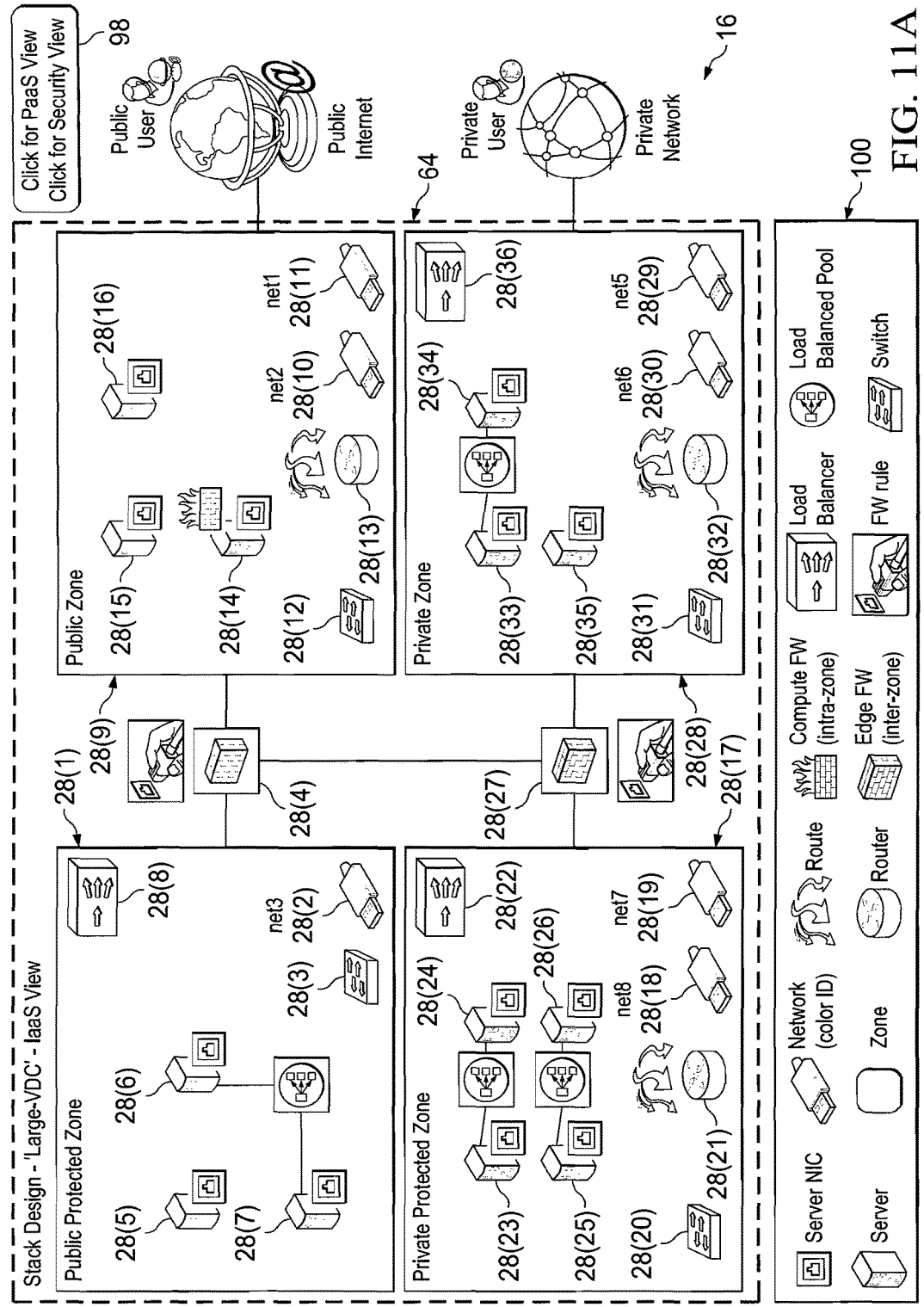
FIG. 11A is a simplified block diagram illustrating yet other example details of an embodiment of the cloud application topology modeling tool.

Turning to FIGS. 11A-11G, FIGS. 11A-11G are simplified block diagrams illustrating example details of an embodiment of cloud application topology modeling tool 10. Stack blueprint 64 may be rendered on user interface 16. Assume merely for example purposes that stack blueprint 64 represents a virtual data center leased to various subscribers. User interface 16 may include selectable options 98 for different views of stack blueprint. For example, the view displayed in FIG. 11A is an IaaS view showing the entire application stack for all the subscribers. Such a view may be available for a stack designer at the service provider. A widget collection 100 available for use at the IaaS view include widgets at several widget grouping tiers, such as zones, compute, storage, network, security, etc., except application layer.

Widget 28(1) represents a public protected zone with internet access on a public network represented by widget 28(2). Public protected zone widget 28(1) may represent, for example, a bronze level virtual data center for a specific subscriber 'A.' A switch widget 28(3) is also included in widget 28(1). A single edge firewall widget 28(4) may be appropriately configured with firewall rules. Servers represented by widgets 28(5)-28(7) may be deployed in public zone widget 28(1). In some embodiments, switch widget 28(3) may be automatically inferred and added to widget 28(1) when more than one server widget is added thereto. Additionally, network parameters may be automatically assigned to server widgets 28(5)-28(7) when corresponding server NIC widgets (not numbered) are associated therewith and with network widget 28(2). A load balancer widget 28(8) may be deployed in widget 28(1), providing load balancing for two server widgets 28(6) and 28(7), but not for server widget 28(5). Appropriate relationship connectors may be automatically rendered when the load balancer parameters are entered for load balancer widget 28(8).

Widget 28(9) represents a public zone with internet access representing, for example, a 'bronze-lite' level virtual data center for another subscriber 'B.' Public zone widget 28(9) may include two public network widgets 28(10) and 28(11). A switch widget 28(12) is also included in widget 28(9). A public router widget 28(13) configured with default routes may be deployed in public zone widget 28(9). Two servers represented by widgets 28(14)-28(15) may be deployed on network widget 28(10). A third server widget 28(16) may be deployed on network widget 28(11). Server widget 28(14) may be protected by a compute firewall. In some embodiments, switch widget 28(12) may be automatically inferred and added to widget 28(9) when more than one server widget is added thereto. Additionally, network parameters may be automatically assigned to server widgets 28(14)-28(16) when corresponding server NIC widgets are associated therewith and with network widgets 28(10) and 28(11).

Assume, merely for example purposes, that subscriber C leases a portion of virtual data center resources on network 1, represented by network widget 28(11) and its associated widgets and a private protected zone, represented by private protected zone widget 28(17). Two private networks, represented by network widgets 28(18) and 28(19) may be deployed in private protected zone widget 28(17). A switch widget 28(20) and a private router widget 28(21) may be also deployed. A load balancer widget 28(22) may provide load balancing separately between server widgets 28(23) and 28(24) and between server widgets 28(25) and 28(26). A firewall widget 28(27) may protect private access to the private protected zone.

Assume, merely for example purposes, that subscriber D leases a portion of virtual data center resources on network 8, represented by network widget 28(18) and its associated widgets and portions of resources in another private protected zone, represented by private protected zone widget 28(28). Two private networks represented by network widgets 28(29) and 28(30). A switch widget 28(31) and a private router widget 28(32) with a private route may be deployed in private protected zone widget 28(28). Edge firewall 28(27) may protect private protected zone with appropriate firewall rules. Server widgets 28(33)-28(35) may be deployed in private protected zone widget 28(28). Server widgets 28(33) and 28(34) may be load balanced according to load balancer widget 28(36). Server widgets 28(33) and 28(34) may be connected to network widgets 28(29) and 28(3) with appropriate server NIC widgets, and server 28(35) may be disconnected from all networks.

Figure 11B:
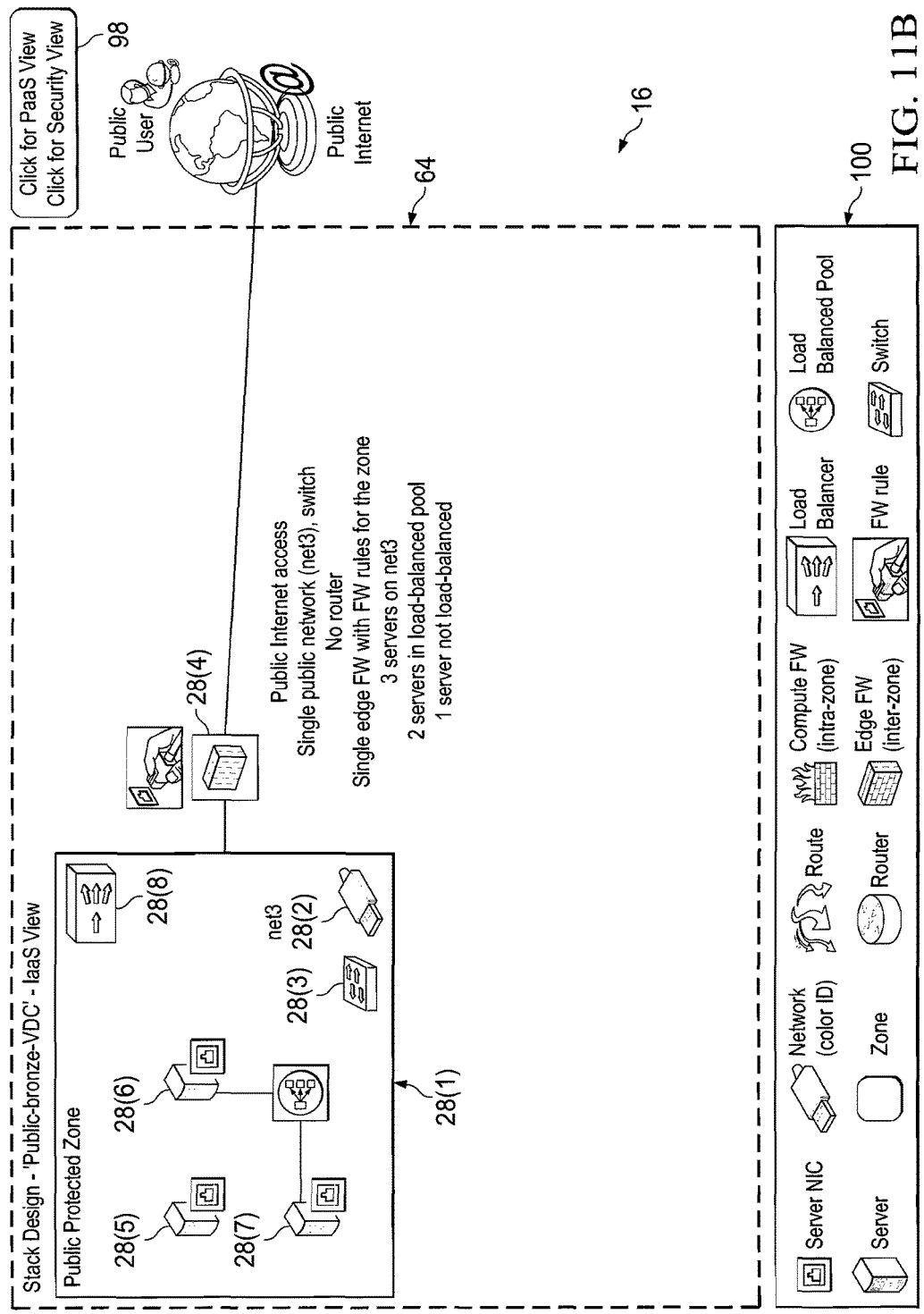
FIG. 11B is a simplified block diagram illustrating yet other example details of an embodiment of the cloud application topology modeling tool.
Figure 11C:
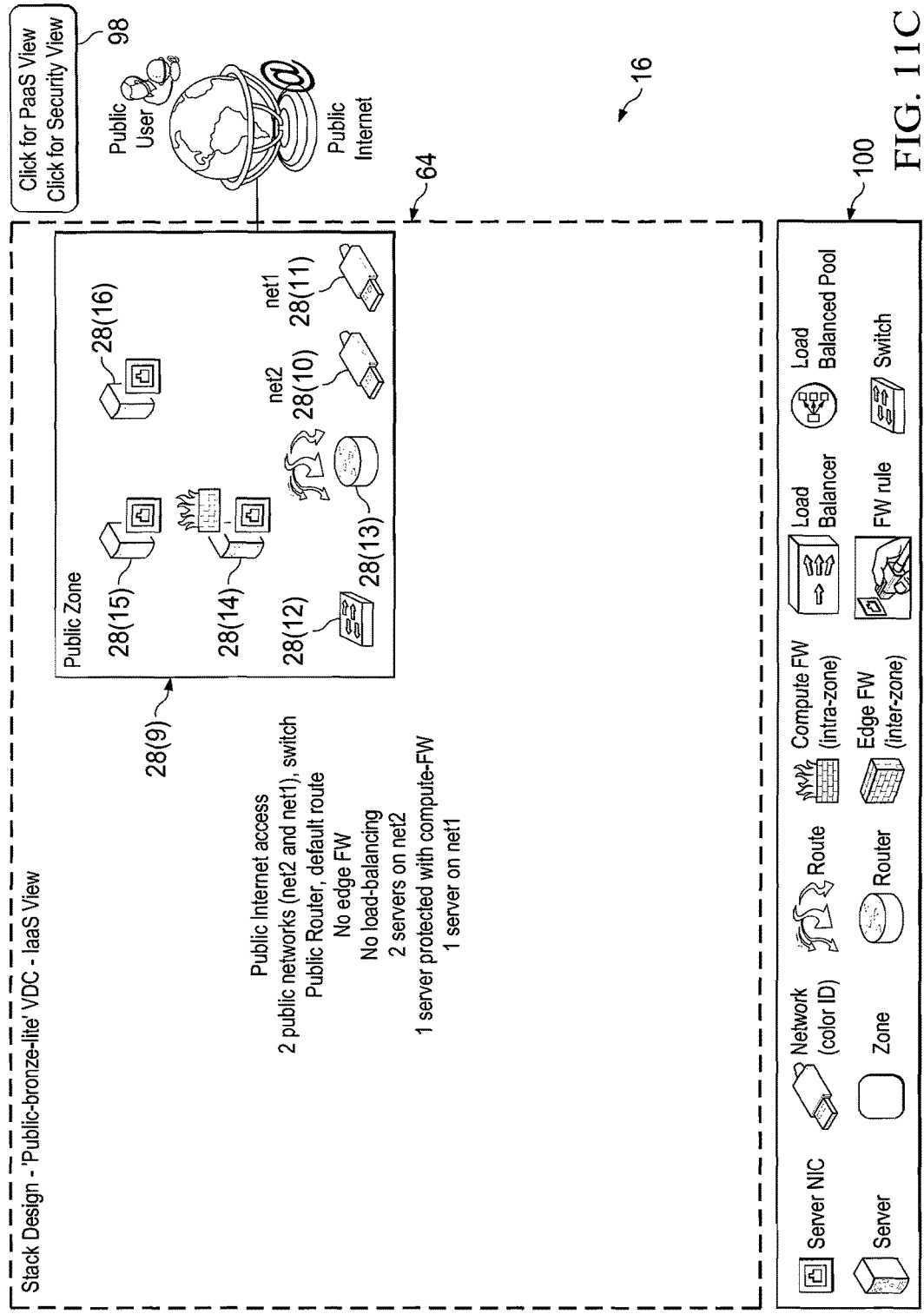
FIG. 11C is a simplified block diagram illustrating yet other example details of an embodiment of the cloud application topology modeling tool.
Figure 11D:
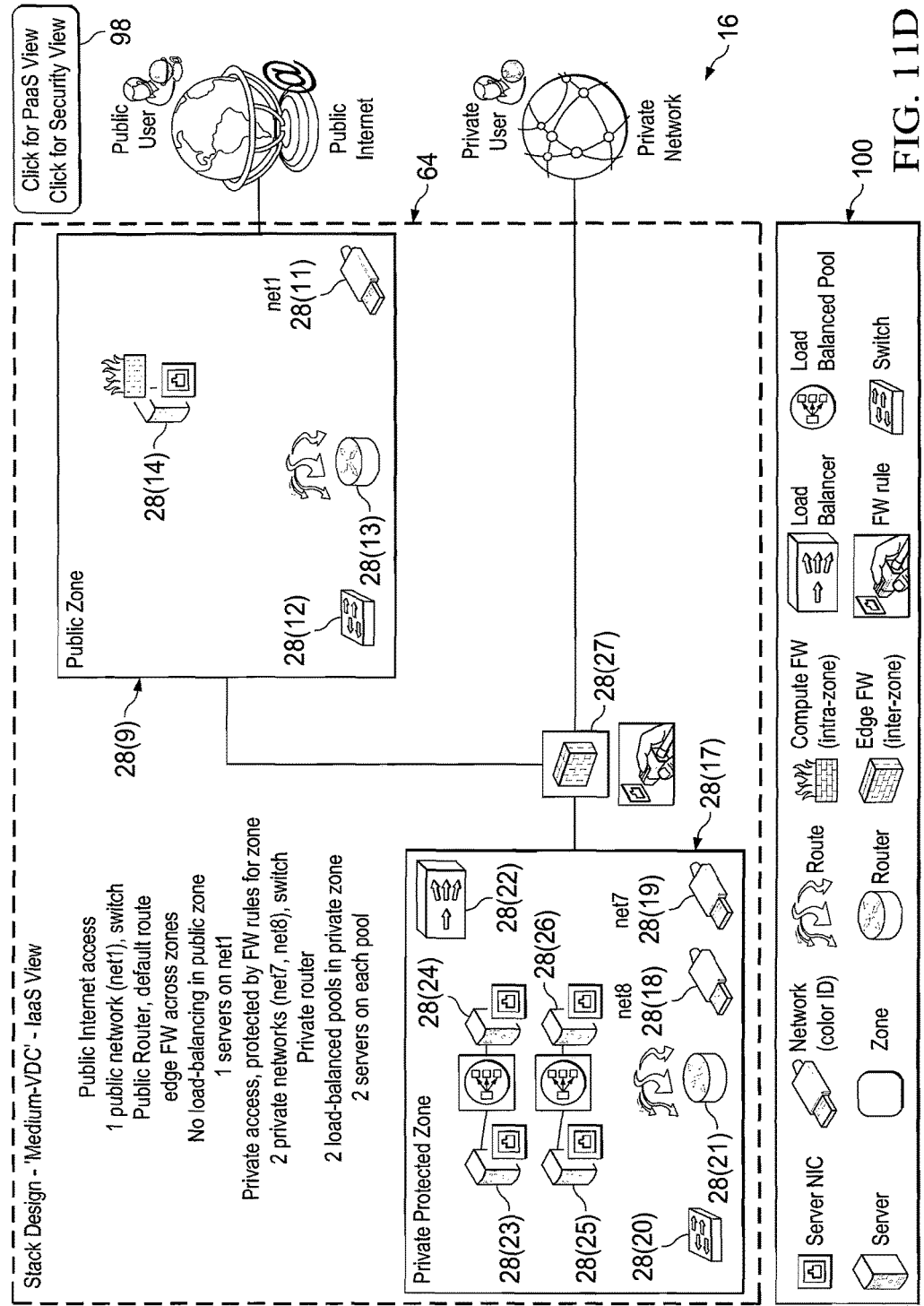
FIG. 11D is a simplified block diagram illustrating yet other example details of an embodiment of the cloud application topology modeling tool.
Figure 11E:
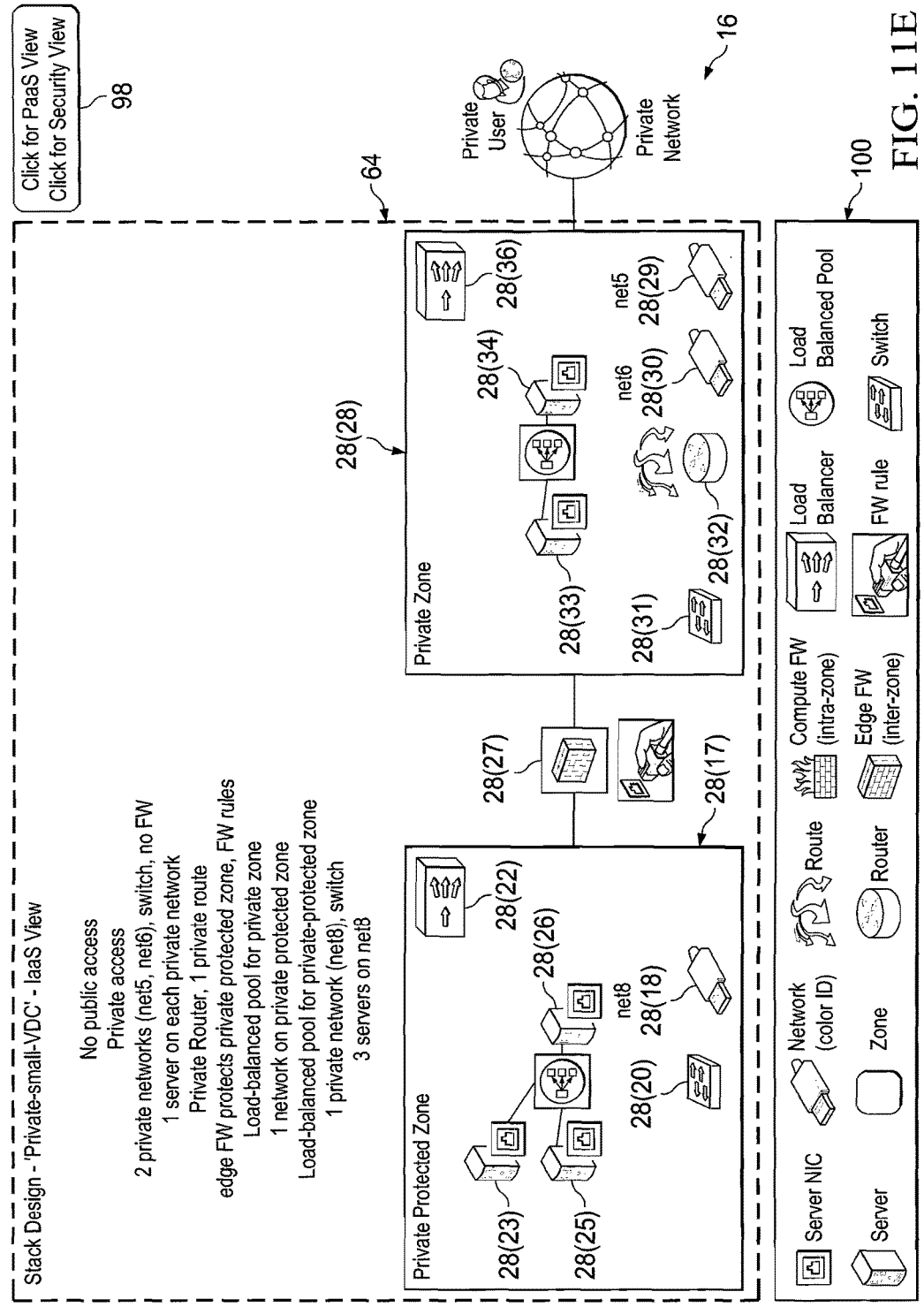
FIG. 11E is a simplified block diagram illustrating yet other example details of an embodiment of the cloud application topology modeling tool.

FIG. 11B is an illustration of a portion of the IaaS view of the same cloud application topology represented by stack blueprint 64 of FIG. 11A, for example, as visible to subscriber A. FIG. 11C is an illustration of another portion of the IaaS view of the same cloud application topology represented by stack blueprint 64 of FIG. 11A, for example, as visible to subscriber B. FIG. 11D is an illustration of yet another portion of the IaaS view of the same cloud application topology represented by stack blueprint 64 of FIG. 11A, for example, as visible to subscriber C. FIG. 11E is an illustration of yet another portion of the IaaS view of the same cloud application topology represented by stack blueprint 64 of FIG. 11A, for example, as visible to subscriber D.

Figure 11F:
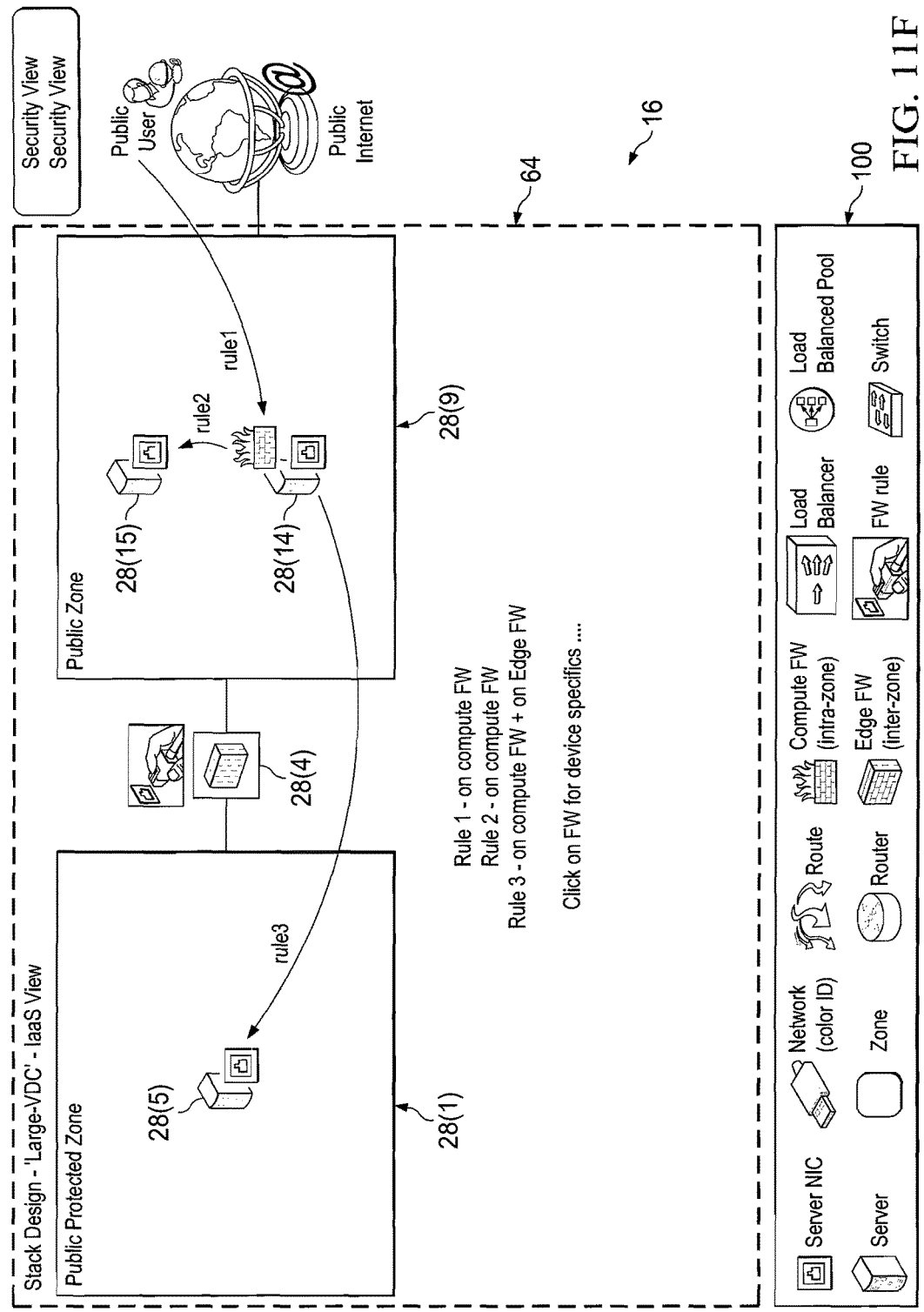
FIG. 11F is a simplified block diagram illustrating yet other example details of an embodiment of the cloud application topology modeling tool.
Figure 11G:
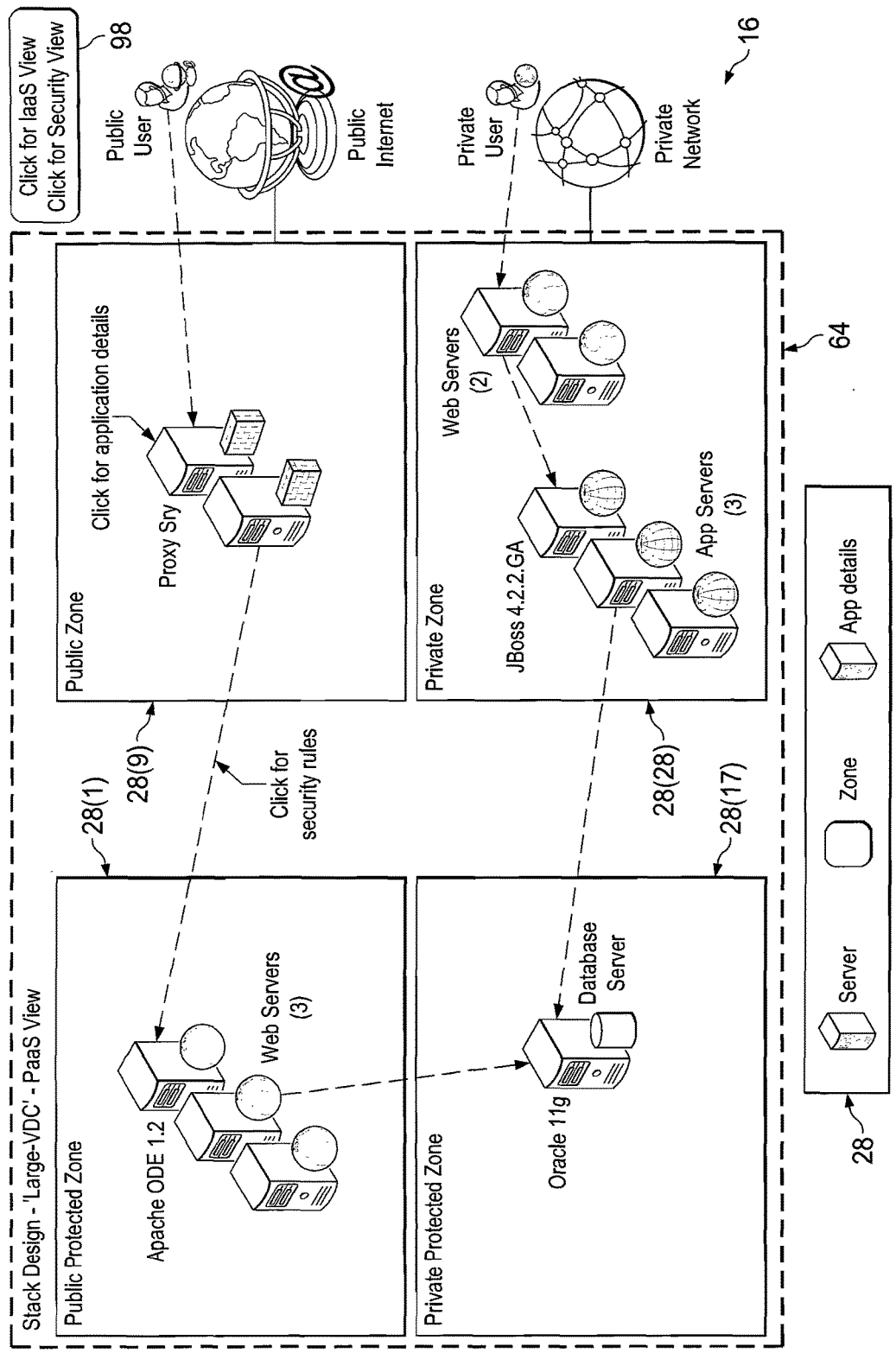
FIG. 11G is a simplified block diagram illustrating yet other example details of an embodiment of the cloud application topology modeling tool.

FIG. 11F is an illustration of a security view of a portion of the same cloud application topology represented by stack blueprint 64 of FIG. 11A. FIG. 11G is an illustration of a PaaS view of the same cloud application topology represented by stack blueprint 64 of FIG. 11A. Widgets 28 available for use and display at the PaaS view represent compute and network tiers only; widgets corresponding to other tiers may be invisible at the PaaS view. User 22 may be allowed to select a widget and obtain other tier information (e.g., application details) as needed and based on particular user or business requirements.

Figure 12:
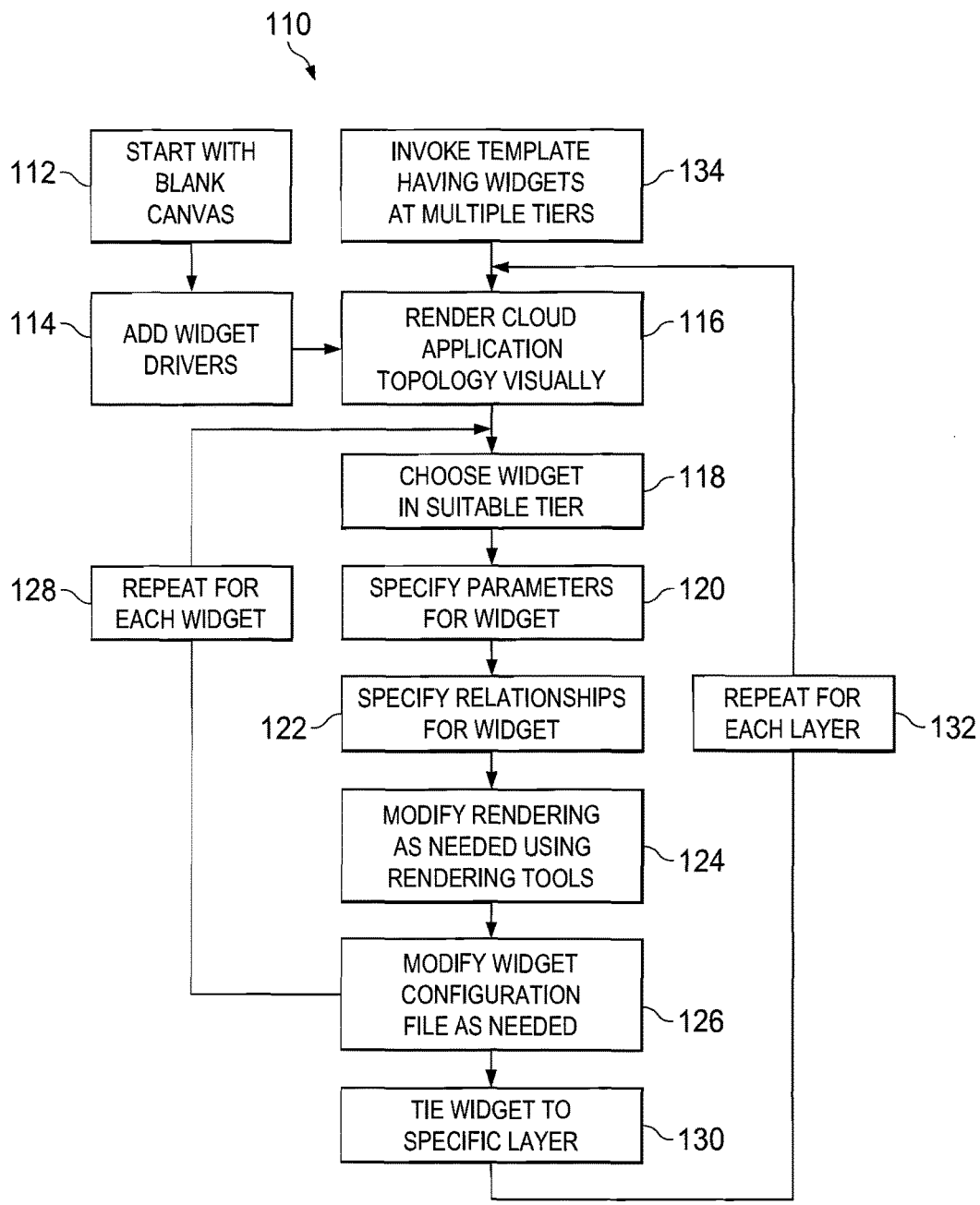
FIG. 12 is a simplified flow diagram illustrating example operations that may be associated with an embodiment of the cloud application topology modeling tool.

Turning to FIG. 12, FIG. 12 is a simplified flow diagram illustrating example operations 110 that may be associated with an embodiment of cloud application topology modeling tool 10. At 112, user 22 may start with blank canvas 26. At 114, user 22 may add widget drivers 56 corresponding to user configured custom widgets 28. At 116, the cloud application topology may be rendered on user interface 16. At 118, user 22 may choose widget 28 in a suitable tier of widget grouping 62. At 120, user 22 may specify parameters for the chosen widget 28. At 122, relationships for widget 122 may be specified. At 124, rendering may be modified as needed using rendering tools 18. For example, user 22 may connect a server NIC widget with a network widget by drawing a line between two connection points on the respective widgets.

At 126, widget configuration file 60 may be modified as needed. For example, the user interactions in terms of entering parameters and establishing relationships may result in a change in widget configuration file 60. At 128, the operations may loop back to 118, to repeat for each widget. At 130, the widgets may be tied to a specific layer. At 132, the operations may loop back to 116, to repeat for each layer. At 134, user 22 may invoke template 70 having widgets at multiple tiers of widget grouping 62.

Figure 13:
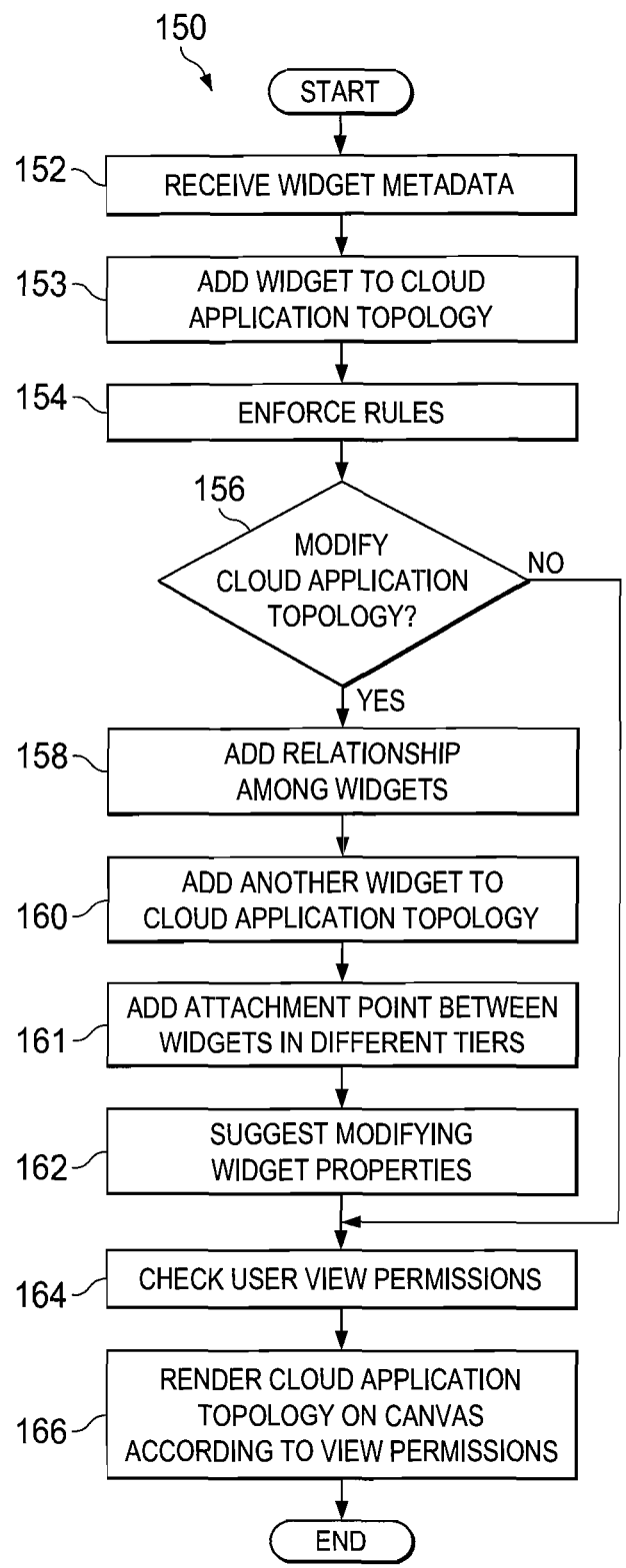
FIG. 13 is a simplified flow diagram illustrating other example operations that may be associated with an embodiment of the cloud application topology modeling tool.

Turning to FIG. 13, FIG. 13 is a simplified flow diagram illustrating example operations 150 that may be associated with an embodiment of cloud application topology modeling tool 10. At 152, user interface 16 receives widget metadata 30 for widget 28. At 153, an instance of widget 28 may be added to the cloud application topology. At 154, widget 28 may enforce rules 42. At 156, a determination may be made whether to modify the cloud application topology. If the cloud application topology is to be modified, at 158, a relationship among widgets on canvas 26 may be added. At 160, another widget may be added to the cloud application topology. At 161, an attachment point between widgets in different tiers may be added. At 162, a suggestion may be displayed on user interface 16 to modify widget properties 38. Various other modifications may also be performed within the broad scope of the embodiments. At 164, user view permissions may be checked. At 166, the cloud application topology may be rendered on canvas 26 according to the view permissions. Turning back to 156, if the cloud application topology is not to be modified, the operations may loop to 164, and continue thereafter.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, tool palette 20. In some embodiments, one or more of these features may be implemented in hardware, provided external to these elements, or consolidated in any appropriate manner to achieve the intended functionality.

The various elements (e.g., tool palette 20, user interface 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, cloud application topology modeling tool 10 described and shown herein (and/or their associated structures) may also include suitable interfaces for receiving, transmitting, and/or otherwise communicating data or information to hardware components (e.g., computer monitors, display devices) and network devices (e.g., client devices) in a network environment. Additionally, a single processor and a single memory element may be responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 14) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 12) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular algorithms, file formats, and certain user interface configurations, cloud application topology modeling tool 10 may be applicable to other algorithms, file formats, and user interface configurations. Moreover, although cloud application topology modeling tool 10 has been illustrated with reference to particular elements and operations that facilitate the computation and display processes, these elements, and operations may be replaced by any suitable architecture or process that achieves the intended functionality of cloud application topology modeling tool 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed by a cloud application topology modeling tool executing on a processor, the method comprising:
   generating a cloud application topology comprising a plurality of widgets, wherein the cloud application topology represents a cloud network infrastructure comprising a plurality of interconnected topology elements, wherein each widget is expressive of an interface representing a base class of a topology element, wherein each topology element is classified in one of a plurality of tiers of the cloud network infrastructure;
   adding a new widget to the cloud application topology, comprising receiving metadata associated with the new widget, the metadata identifying the new widget as belonging to one of a plurality of layers of Open Systems Interconnect (OSI) network model, wherein the new widget is different from at least another widget expressive of an interface representing a base class of another topology element classified in another one of a plurality of tiers;

automatically adding other widgets to the cloud application topology based on the new widget, the added widgets belonging to other layers of the OSI network model from Layer 2 to Layer 7, wherein the added widgets enable the new widget to operate in the cloud network;

generating attachment points between widgets of different tiers according to widget properties specified in the metadata, each attachment point being specific to the tiers and the widgets being attached;

modifying the cloud application topology according to rules described by the metadata without human intervention, wherein the rules specify behavioral constraints on the widgets in a context of the cloud application topology across the plurality of tiers;

rendering the modified cloud application topology on a canvas of a graphical user interface in a plurality of selectively viewable layers, each layer comprising a different portion of the cloud application topology; and generating instructions for automated orchestration of the cloud network based on the modified cloud application topology.

2. The method of claim 1, wherein the metadata describes at least a look, a behavior, a feature, a property, a valid attribute value for the property, and the rules associated with the widget.

3. The method of claim 2, wherein the property comprises at least one property selected from a group consisting of: (a) a definitional property, (b) a visual property, and (c) an orchestration property.

4. The method of claim 1, wherein the rules comprise at least one rule selected from a group consisting of: (a) container rules, (b) validation rules, (c) requirement rules, and (d) relationship rules.

5. The method of claim 1, further comprising:
adding an additional widget comprising the at least another widget to the cloud application topology;
adding an attachment point between the different tiers of the new widget and the additional widget in the cloud application topology.

6. The method of claim 1, wherein modifying the cloud application topology includes at least one action selected from a group consisting of:
(a) adding a relationship with another widget in the cloud application topology;
(b) adding another widget in the cloud application topology; and
(c) suggesting to modify widget properties.

7. The method of claim 1, wherein receiving the metadata comprises loading a widget configuration file comprising the metadata into a memory element.

8. The method of claim 1, wherein adding an instance of the widget comprises adding a pre-defined graphic icon representing the widget on the canvas, wherein the graphic icon is rendered on the canvas as part of the cloud application topology.

9. The method of claim 1, wherein the cloud application topology can be viewed in the plurality of layers according to different view permissions.

10. The method of claim 1, wherein the cloud application topology on the canvas is converted to a stack blueprint that can be executed to instantiate the cloud application topology.

11. Non-transitory tangible media that includes instructions of a cloud application topology modeling tool for execution, which when executed by a processor, is operable to perform operations comprising:
generating a cloud application topology comprising a plurality of widgets, wherein the cloud application topology represents a cloud network infrastructure comprising a plurality of interconnected topology elements, wherein each widget is expressive of an interface representing a base class of a topology element, wherein each topology element is classified in one of a plurality of tiers of the cloud network infrastructure;

adding a new widget to the cloud application topology, comprising receiving metadata associated with the new widget, the metadata identifying the new widget as belonging to one of a plurality of layers of OSI network model, wherein the new widget is different from at least another widget expressive of an interface representing a base class of another topology element classified in another one of a plurality of tiers;

automatically adding other widgets to the cloud application topology based on the new widget, the added widgets belonging to other layers of the OSI network model from Layer 2 to Layer 7, wherein the added widgets enable the new widget to operate in the cloud network;

generating attachment points between widgets of different tiers according to widget properties specified in the metadata, each attachment point being specific to the tiers and the widgets being attached;

modifying the cloud application topology according to rules described by the metadata without human intervention, wherein the rules specify behavioral constraints on the widget in a context of the cloud application topology across the plurality of tiers;

rendering the modified cloud application topology on a canvas of a graphical user interface in a plurality of selectively viewable layers, each layer comprising a different portion of the cloud application topology; and generating instructions for automated orchestration of the cloud network based on the modified cloud application topology.

12. The non-transitory tangible media of claim 11, wherein the operations further comprise:
adding an additional widget comprising the at least another widget to the cloud application topology;
adding an attachment point between the different tiers of the new widget and the additional widget in the cloud application topology.

13. The non-transitory tangible media of claim 11, wherein modifying the cloud application topology includes at least one action selected from a group consisting of:
(a) adding a relationship with another widget in the cloud application topology;
(b) adding another widget in the cloud application topology; and
(c) suggesting to modify widget properties.

14. The non-transitory tangible media of claim 11, wherein the cloud application topology can be viewed in the plurality of layers according to different view permissions.

15. The non-transitory tangible media of claim 11, wherein the cloud application topology on the canvas is converted to a stack blueprint that can be executed to instantiate the cloud application topology.

16. An apparatus, comprising:
a cloud application topology modeling tool comprising instructions associated with data;

a non-transitory memory element for storing the data and the instructions; and a processor, wherein the processor executes the instructions associated with the data, wherein the processor and the non-transitory memory element cooperate, such that the apparatus is configured for:

generating a cloud application topology comprising a plurality of widgets, wherein the cloud application topology represents a cloud network infrastructure comprising a plurality of interconnected topology elements, wherein each widget is expressive of an interface representing a base class of a topology element, wherein each topology element is classified in one of a plurality of tiers of the cloud network infrastructure;

adding a new widget to the cloud application topology, comprising receiving metadata associated with the new widget, the metadata identifying the new widget as belonging to one of a plurality of layers of OSI network model, wherein the new widget is different from at least another widget expressive of an interface representing a base class of another topology element classified in another one of a plurality of tiers;

automatically adding other widgets to the cloud application topology based on the new widget, the added widgets belonging to other layers of the OSI network model from Layer 2 to Layer 7, wherein the added widgets enable the new widget to operate in the cloud network;

generating attachment points between widgets of different tiers according to widget properties specified in the metadata, each attachment point being specific to the tiers and the widgets being attached;

modifying the cloud application topology according to rules described by the metadata without human intervention, wherein the rules specify behavioral constraints on the widget in a context of the cloud application topology across the plurality of tiers;

rendering the modified cloud application topology on a canvas of a graphical user interface in a plurality of selectively viewable layers, each layer comprising a different portion of the cloud application topology; and generating instructions for automated orchestration of the cloud network based on the modified cloud application topology.

17. The apparatus of claim 16, further configured for:

adding an additional widget comprising the at least another widget to the cloud application topology;

adding an attachment point between the different tiers of the new widget and the additional widget in the cloud application topology.

18. The apparatus of claim 16, wherein modifying the cloud application topology includes at least one action selected from a group consisting of:

(a) adding a relationship with another widget in the cloud application topology;

(b) adding another widget in the cloud application topology; and (c) suggesting to modify widget properties.

19. The apparatus of claim 16, wherein the cloud application topology can be viewed in a plurality of layers according to different view permissions.

20. The apparatus of claim 16, wherein the cloud application topology on the canvas is converted to a stack blueprint that can be executed to instantiate the cloud application topology.

* * * * *